US012784566B2

(12) United States Patent
Cheng et al.

(10) Patent No.: US 12,784,566 B2
(45) Date of Patent: Nov. 3, 2026

(54) SYSTEM AND METHOD FOR PREDICTING A FALL

(71) Applicant: ORPYX MEDICAL TECHNOLOGIES INC., Calgary (CA)

(72) Inventors: Chun Hing Cheng, Calgary (CA); Emily Matijevich, Calgary (CA)

(73) Assignee: ORPYX MEDICAL TECHNOLOGIES INC., Calgary (CA)

( * ) Notice: Subject to any disclaimer, the term of this patent is extended or adjusted under 35 U.S.C. 154(b) by 231 days.

(21) Appl. No.: 18/537,980

(22) Filed: Dec. 13, 2023

(65) Prior Publication Data

US 2024/0203228 A1 Jun. 20, 2024

Related U.S. Application Data

(60) Provisional application No. 63/476,192, filed on Dec. 20, 2022.

(51) Int. Cl.
*G08B 21/04* (2006.01)

(52) U.S. Cl.
CPC ....... *G08B 21/043* (2013.01); *G08B 21/0423* (2013.01); *G08B 21/0446* (2013.01)

(58) Field of Classification Search
CPC .................................................. G08B 21/043
USPC ...................................................... 340/573.1
See application file for complete search history.

(56) References Cited

U.S. PATENT DOCUMENTS

| | | | | |
|---|---|---|---|---|
| 10,004,428 | B2 | 6/2018 | Everett et al. | |
| 10,799,154 | B2 * | 10/2020 | Sarkar | A45B 3/00 |
| 11,504,030 | B2 | 11/2022 | Cheng et al. | |
| 11,700,904 | B2 | 7/2023 | Stevens et al. | |
| 2013/0231822 | A1 * | 9/2013 | Gouaillier | G06F 11/30 901/1 |
| 2013/0249695 | A1 * | 9/2013 | Hann | A61B 5/441 340/573.7 |

(Continued)

FOREIGN PATENT DOCUMENTS

| | | | |
|---|---|---|---|
| WO | 2021050966 | A1 | 3/2021 |
| WO | 2021092676 | A1 | 5/2021 |

OTHER PUBLICATIONS

Insoo Kim, Kyung-Suk Lee, Kyungran Kim, Kyungsu Kim, Hye-Seon Chae & Hyo-Cher Kim (2020) Implementation of a real-time fall detection system for elderly Korean farmers using an insole-integrated sensing device, Instrumentation Science & Technology, 48:1, 22-42, DOI: 10.1080/10739149.2019.1648293.

(Continued)

*Primary Examiner* — Travis R Hunnings
(74) *Attorney, Agent, or Firm* — ABM INTELLECTUAL PROPERTY INC.; Adrienne Bieber McNeiil

(57) ABSTRACT

A method for predicting a fall includes: obtaining a series of force data using a plurality of force sensors worn on a subject's foot over a time window; obtaining a series of inertial measurement unit (IMU) data from at least a first IMU worn on the subject's foot over the time window; inputting input data into a machine learning model, where the input data includes at least the series of force data and the series of IMU data, and where the machine learning model (Continued)

is trained to employ a set of parameters to generate fall prediction data using the input data; and outputting an indication of the fall prediction data.

20 Claims, 8 Drawing Sheets

(56) References Cited

U.S. PATENT DOCUMENTS

| | | | | |
|---|---|---|---|---|
| 2016/0210838 | A1* | 7/2016 | Yan | G08B 25/001 |
| 2018/0177436 | A1* | 6/2018 | Chang | A61B 5/1101 |
| 2019/0347922 | A1* | 11/2019 | Burton | G01P 15/0891 |
| 2020/0218974 | A1 | 7/2020 | Cheng et al. | |
| 2020/0309611 | A1* | 10/2020 | Marchais | G06F 3/016 |
| 2021/0256829 | A1* | 8/2021 | Ten | G08B 21/0469 |
| 2022/0101710 | A1* | 3/2022 | Tunnell | A61B 5/746 |
| 2022/0108595 | A1* | 4/2022 | Jiang | G08B 25/016 |
| 2022/0157145 | A1* | 5/2022 | Panneer Selvam | A61B 5/0002 |
| 2022/0172594 | A1* | 6/2022 | Cho | B60Q 5/006 |
| 2022/0199235 | A1* | 6/2022 | Knickerbocker | G06Q 50/06 |
| 2022/0292523 | A1* | 9/2022 | Yamada | G06Q 50/26 |
| 2023/0158368 | A1* | 5/2023 | Blades | A63B 24/0062 702/139 |
| 2023/0189918 | A1 | 6/2023 | Stevens et al. | |
| 2023/0386316 | A1* | 11/2023 | Guilbeault-Sauve | G08B 21/043 |
| 2024/0085985 | A1* | 3/2024 | Winters, IV | G06F 3/015 |

OTHER PUBLICATIONS

Maxwell Fordjour Antwi-Afari, Heng Li, Fall risk assessment of construction workers based on biomechanical gait stability parameters using wearable insole pressure system, Advanced Engineering Informatics, vol. 38, 2018, pp. 683-694, ISSN 1474-0346, https://doi.org/10.1016/j.aei.2018.10.002. (https://www.sciencedirect.com/science/article/pii/S147403461830301X).

Mirko Di Rosa, Jeff M. Hausdorff, Vera Stara, Lorena Rossi, Liam Glynn, Monica Casey, Stefan Burkard, Antonio Cherubini, Concurrent validation of an index to estimate fall risk in community dwelling seniors through a wireless sensor insole system: A pilot study, Gait & Posture, vol. 55, 2017, pp. 6-11, ISSN 0966-6362, https://doi.org/10.1016/j.gaitpost.2017.03.037. (https://www.sciencedirect.com/science/article/pii/S0966636217301108).

* cited by examiner

SYSTEM AND METHOD FOR PREDICTING A FALL

CROSS REFERENCES TO RELATED APPLICATIONS

This application claims the benefit of U.S. Provisional Patent Application No. 63/476,192 filed on Dec. 20, 2022, which is incorporated herein by reference in its entirety.

FIELD

This document relates to fall prediction. More specifically, this document relates to systems and methods for predicting a fall using sensors worn on a subject's foot.

BACKGROUND

International Patent Application Publication No. WO2021050966A1 (Coffey et al.) discloses a system that includes a sensor configured to generate data associated with movements of a resident for a period of time, a memory storing machine-readable instructions, and a control system arranged to provide control signals to one or more electronic devices. The control system also includes one or more processors configured to execute the machine-readable instructions to analyze the generated data associated with the movement of the resident, determine, based at least in part on the analysis, a likelihood for a fall event to occur for the resident within a predetermined amount of time, and responsive to the determination of the likelihood for the fall event satisfying a threshold, cause an operation of the one or more electronic devices to be modified.

SUMMARY

The following summary is intended to introduce the reader to various aspects of the detailed description, but not to define or delimit any invention.

A method and system for predicting a fall are disclosed.

According to some aspects, a method for predicting a fall includes: a) obtaining a series of force data using a plurality of force sensors worn on a subject's foot over a time window; b) obtaining a series of inertial measurement unit (IMU) data using at least a first IMU worn on the subject's foot over the time window; c) inputting input data into a machine learning model, wherein the input data comprises at least the series of force data and the series of IMU data, and wherein the machine learning model is trained to employ a set of parameters to generate fall prediction data using the input data; and d) outputting an indication of the fall prediction data.

In some examples, the machine learning model includes at least one machine learning algorithm.

In some examples, at least one of the machine learning algorithms is a deep learning neural network.

In some examples, the parameters include at least one of a weight and a bias.

In some examples, the method further includes analyzing the series of force data using a 3D convolutional subnetwork.

In some examples, at least one of the machine learning algorithms is a random forest.

In some examples, the fall prediction data includes at least one risk score.

In some examples, the method further includes comparing the risk score to a threshold. The indication of the fall prediction data may include an alert that is issued if the risk score exceeds the threshold.

In some examples, the fall prediction data includes a plurality of fall contributors and a risk score for each respective fall contributor.

In some examples, the indication of the fall prediction data includes an indication that a fall is imminent and/or an indication of the fall contributor for an imminent fall.

In some examples, the fall contributor includes at least one of dizziness, muscle weakness, joint stiffness, instability, imbalance, gait bias to one side, gait bias to front, gait bias to back, trembling, visual impairment, lack of consciousness, nervousness, and lack of focus.

In some examples, the indication of the fall prediction data comprises an indication of the risk score for an imminent fall.

In some examples, the method further includes: e) prior to step c), training the machine learning model using training data recorded while a participant performs an ambulatory activity.

In some examples, the training data includes training force data, training IMU data, and training supplemental data.

In some examples, step e) includes training the machine learning model using a hierarchy of machine learning algorithms, wherein the training force data and the training IMU data are assigned a higher place in the hierarchy than the training supplemental data.

In some examples, step e) includes training the machine learning model using a hierarchy of machine learning algorithms comprising at least one high machine learning algorithm or combination of algorithms and at least one low machine learning algorithm or combination of algorithms, wherein when training a low machine learning algorithm or combination of algorithms the parameters of the high machine learning algorithm or combination of algorithms are frozen or initialized.

In some examples, the method further includes, prior to step c), training the machine learning model using a clinical test by determining a risk score for the clinical test; during step c), recognizing conditions for the clinical test; and generating the fall prediction data based on the clinical test.

In some examples, the method further includes using interpolation to fill gaps in the training data.

In some examples, the participant is not the subject.

In some examples, the input data further includes supplemental data. The supplemental data may include at least one of kinetic data obtained from the first IMU and the plurality of force sensors, and kinematic data obtained from the first IMU. The method may further include subjecting at least one of the force data, the IMU data, the kinematic data, and the kinetic data to statistical analysis and/or feature extraction.

In some examples, the supplemental data includes clinical assessment data, gait related data, physical health data, mental health data, and/or demographic data.

In some examples, the machine learning model employs time series analysis, interpolation, and/or pattern recognition on the supplemental data.

In some examples, the force sensors and first IMU are carried by a first input device, and the supplemental data is obtained from a second input device.

In some examples, the input data includes raw data and/or processed data.

In some examples, the method further includes ranking the input data from most important in generating the fall prediction data to least important in generating the fall prediction data.

In some examples, the method further includes providing coaching and/or feedback based on the fall prediction data.

In some examples, the fall prediction data is for a current time point, and the time window is a fixed size window that precedes and moves with the current time point.

In some examples, the method further includes storing the input data and/or the fall prediction data.

In some examples, during step a) and b) the force sensors and first IMU are worn underfoot.

In some examples, the force sensors and first IMU are carried by at least one insole.

According to some aspects, a system for predicting a fall includes an input device that is wearable on a subject's foot. The input device includes a plurality of force sensors for use in obtaining a series of force data from the subject's foot over a time window, and at least a first inertial measurement unit (IMU) for use in obtaining a series of IMU data from the subject's foot over the time window. The system further includes a non-transitory storage memory storing a machine learning model trained to employ a set of parameters to generate fall prediction data using input data that includes at least the series of force data and the series of IMU data. The system further includes a processor configured to receive the force data and the IMU data from the input device and input the input data into the machine learning model, and an output device for outputting an indication of the fall prediction data.

In some examples, the machine learning model includes at least one machine learning algorithm.

In some examples, at least one of the machine learning algorithms is a deep learning neural network.

In some examples, the set of parameters includes at least one of a weight and a bias.

In some examples, the machine learning model is trained to analyze the force data using a 3D convolutional subnetwork.

In some examples, at least one of the machine learning algorithms is a random forest.

In some examples, the fall prediction data includes a risk score.

In some examples, the processor is configured to compare the risk score to a threshold, and the output device is configured to output the indication of the fall prediction data in the form of an alert that is issued if the risk score exceeds the threshold.

In some examples, the output device is configured to output the indication of the fall prediction data in the form of an indication that a fall is imminent and/or an indication of a fall contributor for an imminent fall.

In some examples, the output device is configured to output the indication of the fall prediction data in the form of a risk score for an imminent fall.

In some examples, the input data further includes supplemental data. The supplemental data may include at least one of kinetic data obtained from the first IMU and the plurality of force sensors, and kinematic data obtained from the first IMU. In some examples, the processor is configured to subject the force data, the IMU data, the kinetic data, and/or the kinematic data to statistical analysis and/or feature extraction.

In some examples, the supplemental data includes clinical assessment data, gait related data, physical health data, mental health data, and/or demographic data.

In some examples, the machine learning model is configured to employ time series analysis, interpolation, and/or pattern recognition on the supplemental data.

In some examples, the system further includes a second input device configured to obtain the supplemental data, wherein the second input device is separate from the input device.

In some examples, the input data includes raw data and/or processed data.

In some examples, the machine learning model is configured to rank the input data from most important in generating the fall prediction data to least important in generating the fall prediction data.

In some examples, the output device is further configured to provide coaching and/or feedback based on the fall prediction data.

In some examples, the machine learning model is configured to generate the fall prediction data for a current time point, and the time window is a fixed size window that precedes and moves with the current time point.

In some examples, the system is further configured to store the input data and/or the fall prediction data.

In some examples, the input device is configured such that the force sensors and first IMU are positioned underfoot.

In some examples, the input device comprises at least a first insole.

In some examples, the output device includes a visual output device, an auditory output device, and/or a tactile output device.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
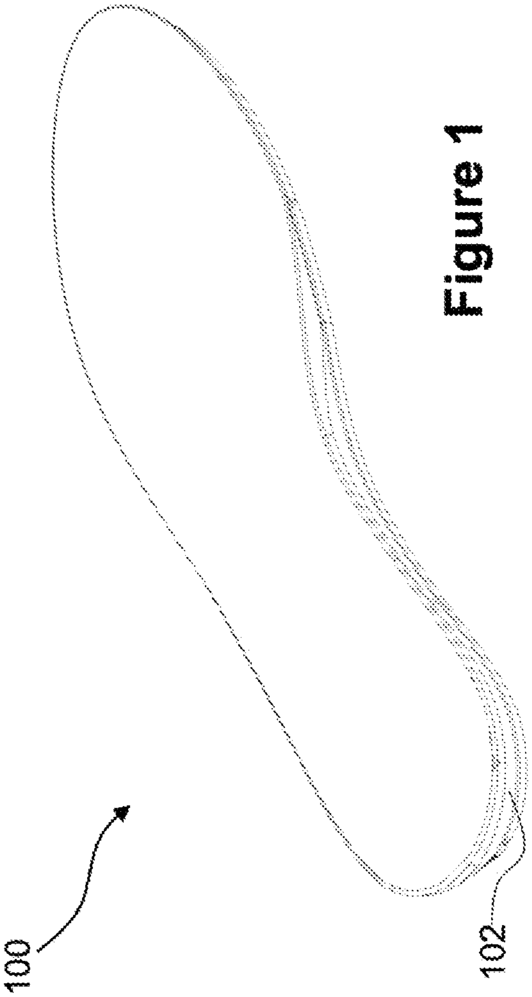
FIG. 1 is a perspective view of an example insole usable in the methods and systems described herein.

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements.

Numerous specific details are set forth herein in order to provide a thorough understanding of the subject matter described herein. However, the subject matter described herein may be practiced without these specific details. In other instances, well-known methods, procedures and components have not been described in detail so as not to obscure the subject matter described herein. The description is not to be considered as limiting the scope of the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, electrical signal, or a mechanical element depending on the particular context. Furthermore, the term "communicative coupling" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof. Furthermore, the wording "at least one of A and B" is intended to mean only A (i.e. one or multiple of A), only B (i.e. one or multiple of B), or a combination of one or more of A and one or more of B.

Terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

As will be set out in further detail below, described herein are methods and systems for predicting a fall, using sensors worn on a subject's foot (e.g. worn underfoot in an insole). As used herein, the term "worn" (and related terms such as "wearable" and "wear") indicates that the referenced part is affixed to, adhered to, placed on, or placed in the subject's body, or affixed to, adhered to, placed on, placed in, placed in proximity to, or integral with the subject's clothing. Such clothing may include but is not limited to a shoe, a sock, an insole, and/or another type of foot-worn clothing (including custom orthotics or generic insoles).

The sensors described herein can include force sensors. As used herein, the term "force" is used broadly and can refer to raw force (i.e. with units of N), or pressure resulting from a raw force (i.e. with units of $N/m^2$). The force data yielded by the force sensors can be used to determine the level of force applied by an individual's foot when performing various activities such as walking, running, sliding or jumping for example.

The systems, and methods described herein may be implemented as a combination of hardware or software. In some cases, the systems, methods, and devices described herein may be implemented, at least in part, by using one or more computer programs, executing on one or more programmable devices including at least one processor, and a data storage element (including volatile and non-volatile memory and/or storage elements). These devices may also have at least one input element (e.g. a pushbutton keyboard, mouse, a touchscreen, and the like), and at least one output element (e.g. a display screen, a printer, a wireless radio, and the like) depending on the nature of the device.

Some elements that are used to implement at least part of the systems, methods, and devices described herein may be implemented via software that is written in a high-level procedural language such as object-oriented programming. Accordingly, the program code may be written in any suitable programming language such as Python or C for example. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

Generally disclosed herein are systems and methods for predicting a fall, using data obtained from sensors worn on a subject's foot. The sensors may include a plurality of force sensors, and at least a first inertial measurement unit (IMU), which are used to obtain force data and IMU data, respectively. In particular, the plurality of force sensors may be worn on a subject's foot over a time window, and may be used to obtain a series of force data. Likewise, the first IMU may be worn on the subject's foot over the time window, and may be used to obtain a series of IMU data. In some particular examples, the sensors are included in an input device in the form of an insole (or alternatively, a pair of insoles) which may be inserted into a subject's shoe and worn underfoot. The input device may in turn be part of a system, which may further include a non-transitory storage memory storing a machine learning model trained to generate fall prediction data using at least the series of force data and the series of IMU data, a processor configured to input the series of force data and the series of IMU data into the machine learning model (either as raw measurements or processed measurements), and an output device for outputting an indication of the fall prediction data (e.g. outputting a visual, auditory, or tactile alert of an imminent fall).

Figure 2:
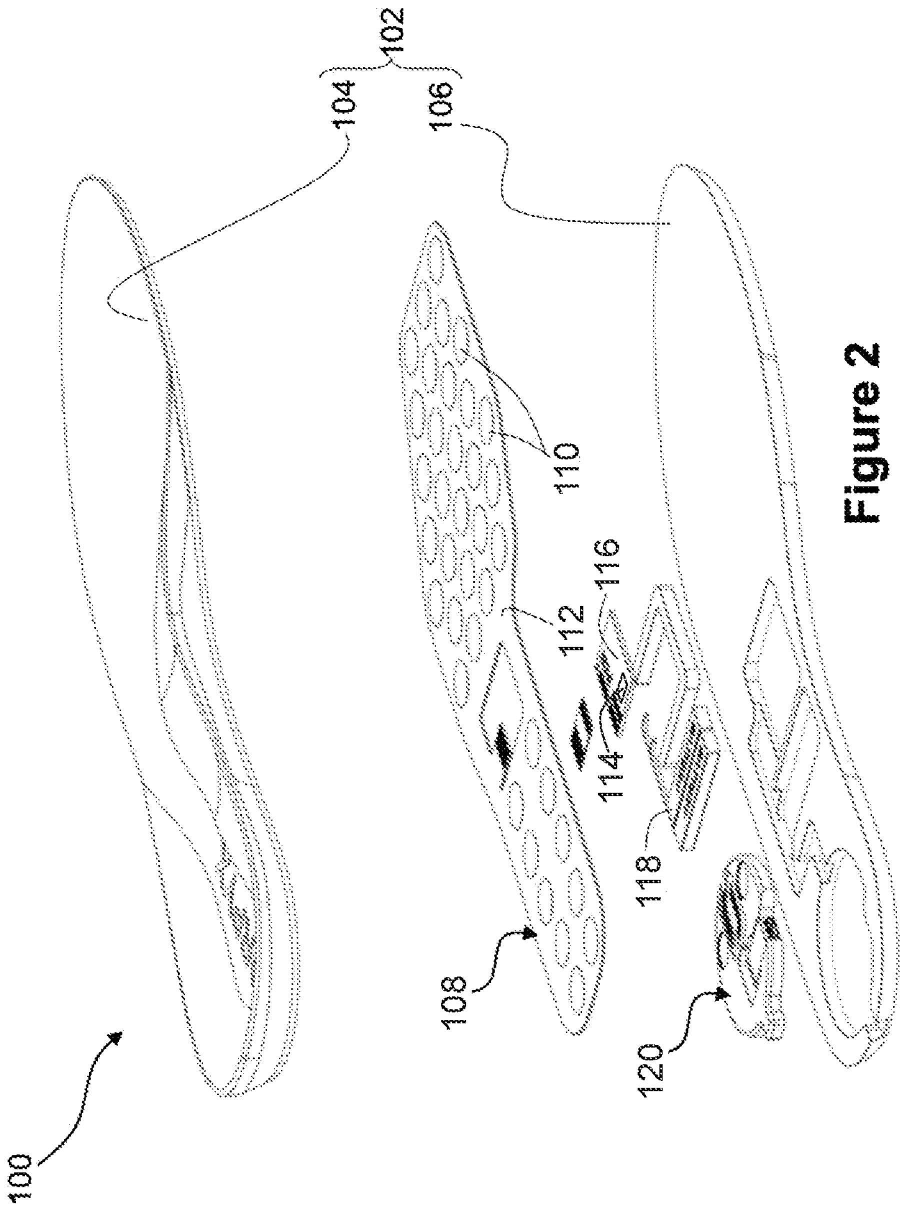
FIG. 2 is an exploded view of the insole of FIG. 1.

Referring to FIGS. 1 and 2, an example input device in the form of an insole 100 is shown. The insole 100 may be worn in direct contact with the subject's skin, or may be spaced from the subject's skin (e.g. by a sock). Insoles usable in the methods and systems described herein may be of a variety of configurations, of which insole 100 is but one example. For example, the insoles may be those available from Orpyx Medical Technologies Inc. (Calgary, Canada) under the brand name Orpyx SI®. For further example, the insoles may be those described in U.S. Pat. No. 10,004,428 (Everett et al.), International Patent Application Publication No. WO/2021/092676 A1 (Everett et al.), U.S. Pat. No. 11,700,904 (Stevens et al.), and/or United States Patent Application Publication No. 2023/0189918 (Stevens et al.). Each of the aforementioned documents is incorporated herein by reference in its entirety.

Referring first to FIG. 1, in the example shown, the insole 100 includes an insole bulk 102, which may be made up of one or more layers such as a cushion layer, a support layer, a gel layer, an anti-odor layer, a thermal insulation layer, and/or a foam layer. In the example shown, the insole 100 is in the form of an orthotic that is custom manufactured for a subject. For example, the subject's foot may be assessed (e.g. by a podiatrist, optionally using plaster casting or 3D scanning), and the insole bulk 102 may be custom fashioned based on the assessment, for example in order to support the subject's foot, improve foot function, relieve pain, and/or relieve pressure. In the example shown, the insole bulk 102 includes a top layer 104 and a base layer 106 (shown in FIG. 2). The top layer 104 may in turn include multiple sub-layers, such as an upper finishing layer (not shown), a middle comfort layer (not shown), and a contoured layer (not shown). Likewise, the base layer may include multiple sub-layers (not shown).

In other examples, the insole may be another type of insole, such as a generic insole (e.g. a comfort insole, a flat insole, an athletic insole, a shock-absorbing insole, or a gel insole). Furthermore, the insole may in some examples be integral with a shoe. The insole may be available in different sizes.

Referring still to FIG. 2, the insole 100 further includes a force sensor array 108 embedded in the insole bulk 102. The force sensor array 108 includes a plurality of force sensors 110 (only two of which are labelled) printed on flexible polymer film 112. Each force sensor 110 may obtain continuous or frequent interval measurements and may produce a series of measurements over a time window (i.e. a time window that is fixed in size and that precedes and moves with the current time point). A higher force sensor data rate (e.g. 64 Hz, 128 Hz or 256 Hz) may in some examples be preferred, to reduce pre-process noise occurring during data down sampling. The force sensors 110 may be flat and flexible. For example, the force sensors 110 may be force sensing resistors, pressure sensors, piezoelectric tactile sensors, elasto-resistive sensors, capacitive sensors or more generally, any type of force sensor that can be integrated into an input device such as insole 100. The number of force sensors 110 may depend on the size of the subject's foot and may be determined by a set metric relating to the subject's foot. For example, the force sensors 110 may cover 25% of the surface area of the subject's foot. The force sensors 110 may also cover critical areas of the subject's foot. For example, the force sensors 110 may be denser in the metatarsal and heel areas.

As used herein, the term 'force measurements' is used herein to refer to the raw data generated by the force sensors. These force measurements may be processed downstream (e.g. normalized and/or standardized, such as normalized by the bodyweight of the subject), for example by a processor as described below, to yield 'processed force measurements'. The term 'force data' is used herein to generally refer to the 'force measurements', and/or the 'processed force measurements'. That is, the term 'force data' may refer to force measurements, processed force measurements, or a combination thereof. The term 'series of force data' refers to force data relating to measurements taken in series over a time window.

The force sensors 110 may also be separated into unit areas. For example, the force sensors 110 may be separated into heel, midfoot and forefoot unit areas to simplify analysis. Calculations (e.g. center of pressure) may be completed on each unit area to determine information relating to each unit area.

In the example shown, the insole 100 further includes at least a first IMU 114. In the example shown, the IMU 114 is integral with processor 116 (described below), and is shown schematically. The IMU 114 can include one or more sensors for measuring the position and/or motion of the subject. For example, the IMU 114 may include one or more of a gyroscope, accelerometer (e.g., a three-axis accelerometer), magnetometer, orientation sensor (for measuring orientation and/or changes in orientation), angular velocity sensor, and inclination sensor. Generally, the IMU 114 includes at least an accelerometer. The IMU 114 may have a comparable measurement rate to the force measurement rate, although in some cases it may be higher (e.g. 128 Hz) or lower. The IMU 114 may be included in any section of the insole bulk 102 or may be external to the insole bulk 102. For example, the IMU 114 may be included in the subject's shoe or clipped to the subject's shoelaces. More than one IMU may be included within or external to the insole bulk 102 to provide more comprehensive information.

As used herein, the term 'IMU measurements' is used herein to refer to the raw data generated by the IMU 114. These IMU measurements may be processed downstream, for example by a processor as described below, to yield 'processed IMU measurements'. The term 'IMU data' is used herein to generally refer to the 'IMU measurements', and/or the 'processed IMU measurements'. That is, the term 'IMU data' may refer to IMU measurements, processed IMU measurements, or a combination thereof. The term 'series of IMU data' refers to IMU data relating to measurements taken in series over a time window.

Referring still to FIG. 2, the insole 100 further includes a processor 116 that receives force measurements from the force sensors, and IMU measurements from the IMU (and optionally additional measurements from optional supplemental sensors). Measurements from the force sensors 110 may include raw data such as resistance data, capacitance data, and/or other raw data. Likewise, measurements from the first IMU 114 may include raw data. The processor 116 may apply an algorithm for reducing data noise, and/or for scaling/calibrating the measurements, to yield processed force measurements and processed IMU measurements. Communication between the processor and the various sensors may be through any wired or wireless connection.

In an alternative example, the force measurements and/or IMU measurements may be transmitted to a remote processor (not shown) for processing (i.e. it is possible for no processing or for minimal processing to occur within the insole 100). The remote processor may be located on any suitable mobile or other device (e.g. smartphone, smartwatch, tablet, laptop computer, desktop computer, cloud-based server etc.). The remote processor may be used in addition to the processor 116 and may provide additional processing resources not available via the processor 116, or may be used instead of the processor 116.

One example of a remote processor is a cloud server, which may be used to provide additional processing capabilities. For example, some aspects of processing may be delegated to the cloud server to conserve power resources in the insole 100. The cloud server may store the force data and IMU data and/or allow for more complex processing of the force data and IMU data. In some cases, the cloud server, processor 116 and/or other remote processor may communicate in real-time to provide timely feedback to the subject.

Additionally, the force data and/or IMU data may be transmitted through an optional external relay device (e.g. cellphone or wall hub), before being transmitted to the cloud server through a wired or wireless connection. The external relay device may store the force data and/or IMU data until transmission to a remote cloud server or output device is available. Additionally, the external relay device may be included in the remote processor device.

As will be described below the processor 116 and/or remote processor may input at least the force data and the IMU data into a machine learning model (which may be stored in a non-transitory storage memory of the insole, or in a remote non-transitory storage memory), which is trained to employ a set of parameters to generate fall prediction data.

Referring still to FIG. 2, a pair of batteries 118 are further embedded in the insole bulk 102, for providing energy to the components of the insole 100. The batteries 118 can be charged by a wireless charging assembly, which includes a wireless charging transmitter (not shown) and a wireless charging receiver 120 that is embedded in the insole bulk 102.

As noted above, various supplemental sensors may be included in the insole 100, for generating supplemental measurements. Such sensors may include one or more of a temperature sensor, a GPS sensor, a heart rate sensor, a respiratory rate sensor, a blood pressure sensor, a blood oxygen saturation sensor, a blood flow sensor, a blood or environmental content quantification sensor (e.g. glucose, electrolytes, minerals, oxygen, carbon dioxide, carbon monoxide, HbA1C, Ethanol, protein, lipid, carbohydrate, cortisol, lactate, pH, pro- and anti-inflammatory markers, MMPs, growth factors, bacterial content), a hydration status/tissue turgor sensor, a joint position sensor, a gait analysis sensor (including supination and pronation), a device breakdown sensor, a pedometer, an accelerometer, a velocity sensor, a calorimetry sensor, a centre of gravity sensor, a centre of foot position sensor, a friction sensor, a traction sensor, a contact area sensor, a connectivity/insulation sensor, an EEG sensor, a barometer, an altimeter, and/or an ECG sensor.

In further examples, as described below, supplemental sensors may be remote from the insole 100. For example, supplemental sensors may include additional IMUs worn on a subject's upper body.

Optionally, the insole 100 may include one or more stimulators (not shown) for providing feedback to the subject. The stimulator(s) may provide a tactile (e.g. vibratory), audible, or visual stimulus to the subject.

The components of the insole 100 may be generally flat, and/or may be nested within pockets of the insole bulk 102, so that in use the subject generally does not feel the presence of a foreign object under their foot.

In the example shown, the wearable device is in the form of a single insole 100; however, in alternative examples, the wearable device may be in the form of a pair of insoles (i.e. a left insole and a right insole, which can be worn concurrently).

In further alternative examples, the force sensors and IMU may be worn on the subject's foot in another fashion other than via insole 100.

As mentioned above, the insole 100 may be part of a system that includes an output device (not shown). The output device may be, for example, a display screen, a speaker, or a tactile stimulator (e.g. a vibratory device). The insole 100 may be in communication with the output device (optionally in direct communication, or in communication via the relay device, cloud server, or remote processing device). The output device may be configured to output an indication of the fall prediction data (e.g. a visual representation of the fall prediction data, an auditory alert relating to the fall prediction data, or a tactile stimulus relating to the fall prediction data), as described in further detail below.

Methods for predicting a fall using the force data and the IMU data will now be described. For clarity, the methods will be described with reference to insole 100; however, the methods are not limited to insole 100. In general, methods for predicting a fall may include: a) obtaining a series of force data using a plurality of force sensors (e.g. force sensors 110) worn on a subject's foot during a time window (e.g. a time window that is fixed in size and moves with the current time point); b) obtaining a series of inertial measurement unit (IMU) data from at least a first IMU (e.g. IMU 114) worn on the subject's foot over the time window; c) inputting input data into a machine learning model (where the input data includes at least the series of force data and the series of IMU data) that is trained to employ a set of parameters to generate fall prediction data using the input data; and d) outputting an indication of the fall prediction data. The machine learning model may be stored in a non-transitory storage memory, which may be included in the insole 100 or may be remote from the insole 100. A processor (e.g. processor 116 or a remote processor as described above) receives the force data from the force sensors 110 and the IMU data from the IMU 114, and inputs this data (either as raw measurements or processed measurements) into the machine learning model (as 'input data').

The machine learning model may include at least one of a deep learning neural network (DLNN), neural network (NN), artificial neural network (ANN), convolutional neural networks (CNN), recurrent neural network (RNN), long short-term memory network (LSTM), least absolute shrinkage and selection operator (LASSO), Decision trees, random forest, linear regression, and any other machine learning algorithm. The machine learning model may use more than one machine learning algorithm of the same type or of various types to predict conditions for an imminent fall. Also, various machine learning algorithms may be combined.

A machine learning model containing more than one machine learning algorithm, may be used to accommodate different types of input data for the system. For example, locations of sensors and availability and accuracy of measurements may differ from subject to subject. Instead of forcing one system onto the subject, the system may be tailored to the subject's wants and needs. The machine learning model may have a machine learning algorithm or combination of machine learning algorithms for predicting falls using each system. For example, a first subject may want to wear only the insole 100. A first DLNN may employ input data including only force data and IMU data from sensors worn on the subject's foot. A second subject may want to increase the accuracy of the system by wearing insole 100 and also wearing a device with IMUs on the lower shanks of the subject's legs. A second DLNN may be included in the machine learning model, and the second DLNN may employ input data that includes the force data and IMU data from sensors worn on the subject's foot, and the IMU data from the IMUs worn on the subject's lower limbs. The number of DLNNs included in the machine learning model may depend on the training data available, the type of sensors, the type of wearable devices available, and/or the preferences and needs of the subject.

A machine learning model with at least one random forest model may be used for systems with smaller amounts of training data. As used herein, "random forest" refers to a form of supervised ensemble learning and is capable of performing both regression and classification tasks. The random forest may require less training data than a DLNN to produce accurate fall prediction data. Also, the random forest may be more flexible to growth, such as when additional experiments are added for training.

There can be several different types of input data that are input into the machine learning model depending on the location and type of sensors included in the system. In general, as used herein, the term 'input data' refers to any data that is input into the machine learning model, including at least the series of force data force sensors 110 and the series of IMU data from IMU 114. Input data may also include supplemental data. The supplemental data can be derived from the series of force data and/or the IMU data, obtained from supplemental sensors, obtained from outside resources (e.g. health records), or some combination thereof. The supplemental sensors can be worn on the subject's foot (i.e. can be part of the first input device) or can be worn on another body part (i.e. from a second input device).

The system may include multiple input devices worn by the same subject. The insole 100 or a pair of insoles 100 may be considered as a first input device, and the subject may also use a second input device. The second input device may include supplemental sensors used to obtain supplemental data for training or using the system. The supplemental sensors may include sensors that improve or assist with generating accurate fall prediction data. For example, the supplemental sensors may be IMUs included in a second input device attached to the lower limbs and upper body of the subject. A second input device may allow the force data and IMU data from the sensors worn on the subject's foot to be determined separately from each of the individual's lower limb segments. Separate input units may also be included on other parts of the subject's body not discussed here, to obtain measurements from various other points on the body. The second input device can include clothing, an undergarment, jewelry, a watch, an accessory, and/or any other wearable device with sensors that is different and separate from the first input device. The second input device(s) are preferably not placed in areas that may be uncomfortable or impede the subject's regular movement. Discomfort or impediment of regular movement may result in skewed training or use data, and may in some instances cause more falls.

A set of parameters may be included in the machine learning model. The types of parameters may vary according to the type of machine learning algorithm(s) included in the machine learning model. For example, the parameters of a DLNN may include at least one weight and/or at least one bias. Preferably, the parameters of a DLNN include at least one weight. In another example, the parameters of a random forest may include max depth of tree, minimum samples per tree, and max number of features. The parameters are the values that change as the machine learning model learns. The parameters may be initially defined with reference to random values within a defined range, previous data in a training database, subject inputs, or the relationships between input data from separate moments in time. The parameters may be initially defined by relationships between layers in the machine learning model and may be related in a variety of ways. For example, the parameters may be related by sensor locations or timing.

Real time input data may be processed in a fixed size moving time window of data for a current time point. The data window moves with the current time point as data is collected. Examples of real time data include the series of force data obtained using the force sensors 110, which are worn over the time window, and the series of IMU data obtained using the IMU 114, which is worn over the time window. The fixed size moving time window may have two settings: the data rate and length of moving window. The data rate (r) is the rate at which the real time data is fed into the machine learning model. The length of the moving time window (l) is the time interval up to the current point for which the real time data are input into the machine learning model. The following equation may be used to determine the total data count of each of the real time data values input into and processed by the machine learning model.

$$n = rl$$

The series of force data and the series of IMU data may be time synchronized. Additionally, supplemental data from other devices and sensors included in the system may be time synchronized. Time synchronized data may allow for accurate training of the machine learning model and accurate outputs from the machine learning model.

The input data (i.e. the series of force data and the series of IMU data) are preferably real time data. Over a time window, the force sensors are used to obtain a series of force data. Force data may include, for example distribution and variation of the force of the feet on the ground, over the area of each force sensor 110. For two insoles, the series of force data from each insole may be time synchronized and input into the machine learning model. The force data may also be normalized for the subject's body weight. Body weight normalization may create force data that are independent of the subject's weight, which may result in more accurate outputs from the machine learning model. Over the time window, the IMU is used to obtain a series of IMU data. In the examples provided below, the IMU data is not used as is but is instead used to calculate supplemental data for predicting imminent falls. However, in other examples, the IMU data may be used as is.

Additionally, the input data may include supplemental data. Supplemental data may include kinematic data at an instant from various sensors, kinetic data at an instant from various sensors, statistics and feature extraction on force, kinematic, and/or kinetic data values over intervals before current instant from various sensors, gait-related attributes, additional general attributes, and/or clinical assessment attributes. Supplemental data may also include other relevant data that may be used to predict falls. Optionally, only selected supplemental data may be used to reduce processing time. Additionally, not all the listed input data are necessarily independent, and some examples include data that is derived from another data set.

Kinematic data may be determined from the first IMU 114 and/or from IMU sensors from a second input device. Kinematic data is considered a real time data input. A sensor fusion algorithm may be used to combine IMU data and reduce uncertainty in a system with IMUs on multiple locations on the subject's body. The sensor fusion algorithm may also include noise filtering capabilities, if not already completed in earlier processing. Sensor fusion may occur before any down sampling of IMU data. Kinematic data may be determined using formulas, computational methods, or other methods from previous research.

Kinematic data from the subject's foot may be dependent on the IMU data from the IMU 114. For the kinematic data from the subject's foot, the processor may use an ambulatory coordinate system for the subject's body to determine kinematic and kinetic data. For example, the ambulatory coordinate system may have the x-axis in the forward direction (i.e. following the anterior-posterior (AP) line), the z-axis in the vertically upward direction (i.e. following the superior-inferior line), and the y-axis following the convention where the x, y, z axes form a clockwise orthogonal system (i.e. following the medial-lateral line for the left and right foot respectively). For a foot, the origin of the coordinate system is the center of the bottom of the foot, with x=y=z=0.

The kinematic data may all be computed from accelerometer and gyroscope data generated by the IMU. Stationary states on each foot during activity may be identified to reset the linear velocity of the IMU to zero. The use of stationary states may be useful for preventing the accumulative drifting velocity error caused by integration of the accelerometer. Examples of kinematic data at an instant may include Euler angles of rotation or orientation of the foot about the x, y, z axes, with respect to the rest position, components of angular velocity of the foot about the x, y, z axes, components of linear velocity of the foot along the x, y, z axes, components of linear acceleration of the foot along the x, y, z axes, position of a point (x, y, z) fixed on the foot. The position of a point fixed on the foot may include COM of the foot (when the position of the IMU on the foot is known), at the instant relative to the initial position of the point at the start of a step. For x and y, a step-detection algorithm is first applied to identify the state when a step starts. For z, the position is based on the stationary state of the IMU.

Supplemental data may also include kinematic data from IMUs placed on other parts of the body. The kinematic data may be determined from the IMU(s) not located on the foot or may be determined from the combination of the IMU(s) worn on the subject's foot and on other parts of the body. The IMU(s) on other parts of the body may be included in a second input device. IMUs may be placed in areas of the body providing the most important data for generating fall prediction data after the foot IMU(s), based on previous research or expert knowledge. The supplemental IMU data may be used to determine locations and movements of body segments by themselves and with respect to other body segments, which may improve the accuracy of predicting imminent falls. For example, the IMU(s) on other parts of the subject's body may be used to determine Euler angles of rotation, angular velocity, linear velocity, and acceleration of their respective body segments.

For example, the additional IMUs may be placed on various segments of the patient's lower limbs, such as the left and right shanks and thighs, as well as the back of the pelvis. The orientation of each lower limb segment may also be determined from the lower limb IMUs by a transformation between the ambulatory and segment-based coordinate systems. The angle of inclination of each body segment to the vertical may also be used as a kinematic input to the machine learning model. From the orientation, the angle of the joint between two adjacent segments, such as the ankle, knee and pelvis joints, may also be calculated. The rate of change and the range of the joint angles may be used to determine the subject's flexibility and the limitation of the subject's joint motion, which may affect fall risk. The x, y, z coordinate of the center of mass (COM) at an instant may be determined from the distance of the segment COM from its ends. The length of the segment may also be used to determine the instantaneous position of the knee and ankle joints. The segment lengths may also be input into the machine learning model. From the orientations of the segment and the known location of the IMUs on the segments, the x, y, z coordinates of the ankles, knees and pelvis may be determined, relative to their positions at the start of a step. Therefore, the heights of the ankles, knees, and pelvis above the ground, their sideway shift and forward displacement at the moment of the step, are also known.

One or more IMUs may also be placed on a rigid part of the upper body, such as the back of the shoulders, beneath the neck of the patient. An upper body IMU may not be placed on areas of the upper body that do not provide accurate or useful data for generating fall prediction data. For example, an IMU may not be placed on the subject's head because the IMU data from the head is less valuable for fall prediction and a head-based wearable may be uncomfortable for regular use. The x, y, and z-coordinates of the upper body IMU may be used to determine the forward or backward leaning of the upper body relative to the pelvis, the bending of the posture to the left or right side, and the inclination of the backbone to the vertical (i.e. from the height of the shoulder above the pelvis and the backbone length). The orientation and angular velocity of the upper body IMU about the vertical or about the AP axis may assist with determining any trends in abnormal upper-body gait during motion.

Supplemental data may include kinetic data. Kinetic data includes the pressures, forces and moments acting on various segments of the body. Kinetic data may be computed from the series of force data and the kinematic data at an instant (i.e. real time input over the moving time window). There may be some redundancy in values when kinetic data is included because force data and kinematic data can already be included as inputs. Redundancy may increase the accuracy of fall prediction because there may be no guarantee that the blackbox-like subnetworks exactly produce the well-known kinetic values. Redundancy may produce some useful functions of force and kinematic data that are supplemental to the kinetic values. Kinematic data may be determined using formulas, computational methods, or other methods from previous research.

As with kinematic data at the foot, kinetic data at the foot may be dependent on the force sensor data and the IMU data. Various kinetic data values may be determined from the sensors worn on the subject's foot only. One example may include ground reaction force (GRF), which is made up of vertical and horizontal components. The horizontal component may include shear forces or friction on the ground, which may be calculated using the horizontal acceleration of the foot and masses and accelerations of various segments of the subject's body. The masses and accelerations may be difficult to determine from the force sensors 110. An approximation of GRF may be determined from the AP component (xGRF) and ML component (yGRF) of GRF, which may be determined from the force data from the foot, IMU data from the foot, and a separate machine learning program. The separate machine learning program may be difficult and laborious to include. Instead, the kinetic data may include only the vertical ground reaction force (vGRF). The vGRF on a foot is the sum of all vertical forces at different points on the foot. vGRF is equal to the weight of the human body, adjusted by the vertical accelerations of various parts of the body. A less accurate determination of vGRF may be calculated as the sum of the product of the areas and force readings for all force sensors 110. The estimated vertical ground reaction force and COP may also be computed using a custom interpolation method to interpolate the pressure readings to the entire surface area of the insole. The two described methods of vGRF calculation may both be approximations because the sensors may not cover the subject's entire foot and a complete distribution of force may not be obtained. The vGRF may also be normalized by dividing the vGRF values by the body weight of the subject.

Another example of a kinetic data input calculated from the sensors worn on the subject's foot may include center of pressure (COP). The COP at an instant is the point on the bottom of the foot where the resultant GRF acts. The COP is approximated as the mean position of the force sensors 110, weighted by the forces at the sensors. The COP calculation shows how the forces on the foot move during an activity. Once again, the described method of COP calculation may be an approximation because the sensors may not cover the subject's entire foot. The approximate calculations still capture the effect of the vGRF and COP, which are still valuable for calculating fall prediction data, even without exact values. The vGRF and COP may also be calculated for unit areas of the subject's foot. The values for each unit area of the foot may be separately inputted into the machine learning model.

Kinetic data may also include data computed by the addition of supplemental sensors, including lower limb IMU(s) and upper body IMU(s). One type of kinetic data requiring additional IMU data is the forces and torques at the joint at an instant. The force-vector and torque-vector at the joints between two segments may be determined by inverse dynamics, using standard equations known in the art (e.g. Newton-Euler and Lagrangian mechanics). The calculation may be done at any instant based on the masses and kinematic values of the segments.

From the forces and torques at the joints, a static optimization technique may be used to find the forces on the muscles. The forces on the muscles at an instant are another kinetic value that may be used to predict an imminent fall. The muscle forces may also be included in the input data that is input into the machine learning model.

The COM at an instant is another type of kinetic data that may be calculated from the series of force data, the series of IMU data, and supplemental data from an IMU worn on one or more of the lower limb and upper body. An approximation of the COM of the patient's body may be calculated using the x, y, z positions of the lower limb and upper body IMUs (e.g. knees, pelvis and shoulder) found by kinematics, if the lower limb and upper body IMU data is available. If there are no upper body IMU(s), the COM may be approximated by extrapolation, using the inclination of the backbone to the vertical from the orientation of the pelvis, which may be obtained from the pelvis IMU. If IMUs are only worn on the subject's foot, the COM might not be found through sensor measurements. For a system with only sensors worn on the subject's foot to use COM measurements, the COM may be found through calculation and demographic data from previous studies. For example, the COM may be determined through a calculation where the point is approximately the same for all subjects, adjusted slightly for the sex, age, body-mass-index, and/or waist measurements based on previous research.

Another type of kinetic data that may be included is double stance state. Double stance state is a position where both the subject's feet are on the ground. The base of support (BOS) during the double stance state during ambulation is the area on the ground including all points of contact between the feet and the ground. The points of contact may be identified by first finding the set (S) of the positions of the force sensors (on both feet) with non-negligible force at the instant. BOS may only be measured when certain activities are performed by the subject (e.g. walking and running). Then the BOS is the set of all the points between any pair of points in S (e.g. the convex hull of S). If the COM of the whole body is projected vertically downwards onto the ground, the position of the projection relative to the BOS may indicate the stability and balance of the body at any instant of motion. The system may determine the four distances between the COM projection and the anterior, posterior, medial, and lateral sides of the BOS, respectively. An imminent fall may be likely when the resultant value on the anterior, posterior, medial, or lateral sides of the BOS are small or negative. The four values may be part of the input data that is input into the machine learning model.

Supplemental data may also include statistics and feature extraction on force, kinematic, and/or kinetic data over intervals before current instant. In the previously described examples of supplemental data, the force, kinematic, and/or kinetic data are for the current instant. The values from statistics and feature extraction on data are not real time data values. The data at an instant is determined over a moving window of fixed size before the current instant prior to being input into the machine learning model. The machine learning model may then automatically extract characteristics of the data in the window, which are then output to the next layer. For the statistics and feature extraction, the characteristics may be determined by statistics or feature extraction on forces, kinematic and kinetic values over some interval before the current instant using current knowledge of fall risk. Current knowledge of critical features and statistics of data that may predict falls may come from reliable academic or industry sources (e.g. research in the area, expert knowledge, previous machine learning models in the area). The time interval for the statistics and feature extraction of data may be a previous record of the time window (i.e. the time window preceding the current instant) or may be a different time window. For example, the time interval for the statistics and feature extraction of data may not be fixed in size. The time interval may vary depending on the type of data being analyzed or the type of statistic or feature being identified. For the same characteristic, the length of the time interval may also be different at different instants. For example, the length of the time interval may depend on the length of the previous steps. The start time of the interval may also depend on the type of statistic or feature being identified. Once again, there may be redundancy in the statistic and feature values coming from intervals before the current interval.

Examples of statistics and features may include peak force at some subsets (e.g. front, rear, left and right sides) of the sensors, and maximum vGRF for each foot during the stance phases in the interval; mean force at some subsets of the sensors, and mean vGRF for each foot during the stance phases in the interval; step size and step duration of the last step before the current time; mean increment or decrement (festination) of step size or step duration of the last set of steps before the current time; mean double stance time (with both feet on the ground) in the last set of steps; mean and standard deviation (SD) of step size and step duration of the last set of steps before the current time; mean and maximum time of stopping or almost stopping after each step for the last set of steps before the current time, which may suggest mental or psychological disorder like fear of falling; curvature of the position of the center of foot in the last step before the current time, which may indicate circumduction; percentage of a step where the foot center moves backwards (retropulsion) in the last step before the current time; mean and SD of COP's x- and y-coordinates (relative to the foot bottom center) for each foot during the stance phases in the interval (e.g. to measure sway); mean and SD of COP's x- and y-coordinates of the last step before the current time; mean magnitude of the 2D Fourier Transform (FT) of the motion of the COP for each foot during the stance phases in the interval; mean 1D FT of the x- and y-components of the motion of the COP for each foot during the stance phases in the interval; mean 1D FT of the 3 components of the motion of each joint in the interval (e.g. for velocity of shank IMUs); range of angle of inclination to the vertical for each lower limb segment in the interval; maximum angular velocity for each lower limb segment about x, y, z axes in the interval; mean and angle of rotation for each lower limb segment about x, y, z axes in the interval; maximum joint angle or flexion of each lower limb joint in the interval; maximum joint force and torque of each lower limb joint in the interval; maximum muscular force in each lower limb muscle in the interval; degree of asymmetry between left and right feet, in terms of the difference in force profile for some subsets of the sensors or in vGRF profile, for the last step before the current time or last set of steps before the current time; degree of asymmetry between left and right feet, in terms of the difference in COP trajectory for some subsets of the sensors or in vGRF profile for the last step before the current time or last set of steps before the current time; degree of asymmetry between various positions on the foot (ex. forefoot and rearfoot on each foot) from some subsets of the sensors or in vGRF profile, for a last set of steps before the current time; mean and SD of x, y, z position of the pelvis IMU relative to the COP of both feet for the last set of steps before the current time, to measure sideway trunk leaning; variability in step length, step width, stance time, double support time, foot contact angle, foot clearance, circumduction, vGRF, and/or asymmetry or variability from step to step indicating a level of gait variability; consistency (smoothness) or randomness of IMU and/or sensor signals (e.g. entropy rate and harmonic ratio of signal frequency) for a last set of steps; and/or mean and SD of x, y, and z acceleration of left and right feet and limbs.

One or more of the listed examples of statistics and features may be classified as critical statistics and features. The critical statistics and features may be designated as more important for predicting falls and may include the statistics and features indicating symmetry, stability, and/or motion patterns. For example, the critical statistics may be taken from "difference scores between single-task and dual-task gait measures are better than clinical measures for detection of fall-risk in community-dwelling older adults" (Gait&posture, 2018), which uses certain statistics and features to classify between fallers and non-fallers. The list of critical statistics may include stride length, stride length variability, stride width, stride width variability, stride time, single or double support time, cadence, stance time, stride velocity, stride velocity variability, or some combination thereof. The stride variables may be determined using a dead reckoning algorithm with the IMU data. The dead reckoning algorithm may be made more accurate with a zero velocity update, where the velocity is reset to zero at the instant the foot touches the ground. The dead reckoning algorithm may be used to determine the path of the subject's foot, which may be used to find stride statistics and features. The force sensors 110 and IMU 114 may be used to detect a sudden change in length, width, time or velocity in the most recent stride compared to the stride just before that. When a sudden change is identified, there may be a high tendency of falling in the next moment. For example, the sudden change may be a widening of the subject's stride to increase the BOS to prevent falling. The critical statistics and features and their variabilities (i.e. standard deviation) may be determined over the time window before the current instant.

For some of the listed examples of statistics and features, a step detection algorithm may be used for detecting the size and form of the subject's steps, such as the one described in U.S. Pat. No. 11,504,030 (Cheng et al.), which is incorporated herein by reference in its entirety. The step detection algorithm may assist with determining the length of time window for statistical analysis and feature extraction. The step detection algorithm may also be used to determine the position of the foot or sensor measurements of the foot at a specific point in a step. An activity classification algorithm may also be used to single out specific activities. The machine learning model described herein may be designed for one or more chosen activities. For example, for the elderly population at risk of falls, walking and sliding may be considered important activities where falls may occur. The activity classification algorithm may be used to separate the chosen activities from other activities, such as standing, sitting, jumping, running, or other activities where falls may be caused by other factors. The falls caused by other activities may be more difficult to predict and may require significantly more computation. An example of an activity classification algorithm is described in United States Patent Application Publication No. 2020/0218974 (Cheng et al.), which is incorporated herein by reference in its entirety.

Another example of supplemental data may include gait-related attributes. Gait-related attributes include other gait-related information for the subject that may not be measured using force sensors or IMUs but may also affect gait. Unlike kinematic, kinetic, and statistics and features extraction of data before the current instant, the gait-related attributes may not be reliant on sensor data (e.g. lower limb or upper limb sensor data) and therefore can be added as an input to the machine learning model without the inclusion of supplemental sensor data. The gait-related attributes may include biomechanical, musculoskeletal or mental conditions that may be constant in time, may change gradually over time, or may be due to previous events (e.g. injury or surgery). Unlike sensor data, gait-related attributes may be stable or generally stable over time. The current and latest state of the gait-related attributes may be collected at a point in time (e.g. doctor's appointment) and remain accurate for a longer time (e.g. 1 year).

Some gait-related attributes may not be collected in a numeric form; however, the gait-related attributes may be input into the machine learning model in numeric form. Any gait-related attribute that is not originally in numeric form may be converted into some discrete integer. For example, an attribute that can be ranked may be input as a discrete integer based on ranking (e.g. 0, 1, 2) and class data may be represented as a binary array (e.g. Caucasian: (1, 0, 0), Asian: (0, 1, 0)). In a further example, an attribute that can be categorized as a true or false Boolean may be input as a binary value of 0 or 1. The anecdotal cause of the listed gait-related attributes may not be modelled. Instead, the effects on mobility, inhibition, or pain may be quantified.

Examples of gait-related attributes may include degree of mobility and flexibility of each joint; limitation or inhibition of some motion of segments or joints; degree of pain, discomfort, or avoidance of movement in a joint; degree of pronation, from over-pronation (inward rolling) to under-pronation (supination; walking on the lateral side of the heel); general asymmetry between left and right sides of the body, or on the upper or lower part of the body; existence and severity of each of the foot problems, including bunion, hammer toe, flat foot, foot deformity; existence, severity, history and healing status of diabetic or non-diabetic foot ulcers; existence and severity of osteoarthritis, rheumatism; sensory or motor neuropathies; degree of weakness of muscles, including lower limbs, abdomen, hip etc.

Another example of supplemental data includes general attributes. General attributes include any physical health, mental health, and/or demographic data and characteristics that may indirectly affect fall risk. The general attributes may include long-term issues that are stable or may improve or worsen gradually. The general attributes may also be quantified for the current instant (e.g. at the time of set-up) using similar methods to the gait-related attributes (i.e. ranking, classification, true and false Boolean). Also, general attributes may not be reliant on sensor data and therefore may be added as an input to the machine learning model without the inclusion of supplemental sensor data (e.g. lower limb or upper limb sensor data).

The gait-related and general attributes of the subject may be obtained from health records, medical records, by interviewing the participant, and/or by having the participant or caretaker complete a questionnaire.

Not all collected gait-related or general attributes may be up to date for a subject. Some attribute values may be missing, noisy, incomplete, or erratic. Missing data may be imputed using techniques such as time series analysis, interpolation, pattern recognition and machine learning. For example, the processor may use the mean values for a chosen attribute in the population, if the attribute is not available for a particular person. If a particular attribute is available for only a small number of people in the population and weighting cannot be determined, the attribute may be removed from the machine learning model.

Another example of supplemental data may include clinical assessment attributes. The clinical assessment attributes may include results from clinical tests completed on or by the subject. The clinical tests may include tests to determine the subject's static balance, functional mobility, strength, and endurance. The clinical tests may include standardized clinical tests such as a sit-to-stand standard balance test, one-leg standing test, timed up-and-go test, short physical performance battery test, modified Fullerton advanced balance scale test, frontal reach test, 5-step test, clinical test of sensory interaction in balance test, and another standardized balance or other fall risk clinical test known in the field. The clinical tests may also include mobility and functionality testing, such as joint bend angles, isolated weightlifting capability, limb proprioception, and visual acuity. The results of the clinical tests may be used to determine gait-related and/or general attributes, or the clinical tests may be quantified (e.g. as described for gait-related attributes) as clinical assessment attributes. The performance of the participants completing the standardized clinical test may be used to provide insight into the fall risk of the participant. For example, the clinical assessment attributes may be used to adjust or rectify the inference from the subject's motion by the force sensors 110 and IMU sensors 114, to determine more accurate fall risk data.

The output of the machine learning model is fall prediction data. Fall prediction data may be for a current time point, since the input data is obtained from a time window that moves with the current time point. The fall prediction data may be non-binary, such as a category of risk, which may be assigned a quantitative integer in the form of at least one risk score. Additionally, the fall prediction data may include a plurality of fall contributors and a risk score for each respective fall contributor. The plurality of fall contributors represent one or more immediate causes of falling (e.g. a fall-prone subject's physical, mental and behavioral condition) at the current time point. Examples of fall contributors include muscle weakness, joint stiffness, instability, imbalance, bias to one side, bias to front, bias to back, trembling, dizziness, visual impairment, lack of consciousness, nervousness, and unfocused on movement. Fall contributors may provide the subject, caretaker, and/or third party with a clear alert signal to prevent an imminent fall from happening and may help devise measures to prevent future falls. The fall contributors may not be mutually exclusive. At any instant, a person may be subject to fall risk scores for more than one fall contributor and the fall prediction may be represented as a vector of risk scores for the current time point. For example, a subject may be experiencing an imminent fall with a risk score of 1 for muscle weakness, 8 for instability, and 0 for trembling, where the maximum risk score for each fall contributor is 10. A caretaker may receive the results and bring a cane or walker to correct the instability, to prevent the imminent fall. The number of fall contributors may be reduced to simplify the machine learning model and/or reduce processing time.

The fall prediction data may also indicate the imminence of the fall. When a fall is about to occur, at each time point before that instant, the output (y) may be defined as the reciprocal of the time difference (x) between the time point and the instant of falling. For falls classified by more than one fall contributor, the output vector may be made of the time difference reciprocal for all the fall contributors, with other fall contributor components of the vector having a value of 0. Various formulas may be used to define the output based on imminence of the fall. For example, the formula may be $y=f(x)$, where $f(x)$ is a decreasing function (e.g. $1/x$, $1/(a+x)$, 1/square-root(x), −sigmoid(ax), or −arctangent(ax)), where (a) is some constant. For asymptotic functions, the function may be limited to only account for recent past values. A different function (f) may be used for different fall contributor, which may be chosen based on the accuracy of the results provided by the function using test data.

Alternatively, the fall prediction data may be an overall indication of fall risk for a subject. The various risk scores for more than one fall contributor may be combined to indicate the overall fall risk score for an imminent fall. An overall fall risk may in some examples be easier for the subject, caretaker, and/or third party to understand, versus a set of fall risks (i.e. one for each fall contributor).

Before use of the system, the machine learning model is trained using training data from experiments. The experiments are used to find the parameters of the machine learning model before use. The machine learning model may be trained using large groups of participants with diverse demographic, physical, mental, and other characteristics, who may have experienced falls before or are considered at risk for falls. The accuracy of the system may be increased using a larger group of participants versus a small group. The group of participants may have a wide range of injuries, surgeries, prosthetics, orthotics, or gait issues to train the machine learning model to recognize a variety of fall scenarios.

In some examples, to perform the experiment, each participant is fitted with sensors. The sensors include a plurality of force sensors and at least a first IMU, and may be provided in the form of insole 100. Supplemental sensors may also be used. The training data includes force data and IMU data from the sensors worn on the participant's foot during training experiments, but may also include supplemental training data. For example, the participant may also adhere one or more IMU sensors to other segments of the upper and lower body (e.g. the shanks and thighs of the legs, the back of the pelvis, and the back of the shoulder). If additional IMUs are used (i.e. outside of the IMUs worn on each foot), then the lengths of each body segment and the distance of the IMUs on each segment from the segment's proximal and distal ends may be measured. The segment length measurements may be used to calculate the kinematic and kinetic data used as input data to the machine learning model. In the case of the shoulder IMU, the relative position to the lower limb IMU (e.g. pelvis IMU) may be measured. The data generated by the force sensors and IMUs may be synced and transmitted to the processor in real time.

After the sensors are in place, the participant may perform the chosen activity, which may be an ambulatory activity, such as walking or sliding. While performing the ambulatory activity or other chosen activity, training data is recorded from the sensors and other devices, and an expert in the field or group of experts in the field observe the activity. Preferably, the participant performs the chosen activity on an unobstructed, non-slippery ground. The participant may perform the chosen activity at different speeds, with stops, and/or with other activities. The other activities may not be counted towards the machine learning model training because the other activities may result in inconsistent training data. For example, the participant walks or slides (if walking is not possible) on a level, non-slippery ground along a straight line. If possible, the participant walks at different speeds with stops in between walking sessions and may be required to make a turn when approaching a wall. During the experiment, the participant may be allowed to take a short rest, in either standing or sitting position. The rest and turning periods may not be used to train the machine learning model. Preferably, the participant does not force any falls, but instead is monitored (i.e. training data is recorded). The experts may monitor the participant, and when a potential fall is observed, the expert may intervene to prevent the participant from falling. For example, the expert may ask the participant to steady themselves against a walking aid, or ask the participant to stop the ambulatory activity. Training data is automatically uploaded to a training database and saved for later use. For safety, a caretaker, healthcare practitioner, and/or third party may be close to the participant to assist if any fall occurs during the experiment.

One or more cameras may be used to capture digital media (e.g. photographs or video) of the participant during the experiment. The camera may capture the movements of the participant's legs, feet, lower and upper parts of the body, as well as the eyes and the expression of the face. The camera may move with the person and additional cameras with different angles and types of media may be used. The videos of all the cameras may be time synchronized with one another, as well as with the series of force data and series of IMU data. The video and sensor data may be recorded in a database for the expert to assign fall risk scores.

The experiment may be repeated for a large group of diverse participants. Once a suitable amount of data is collected, the force data and IMU data may be converted to supplemental data (e.g. kinematic, kinetic data, statistics and features). Pre-processing or downsampling may be employed to create uniform data for analysis. Preprocessing may include interpolation or other techniques to fill the gaps in the training data.

The expert in the field or group of experts in the field may analyze the training data and experiments to assign risk scores. First, the expert or group of experts may be given any gait-related attributes or general attributes for each participant to understand the participant's background and conditions, which may affect the assignment of risk scores. Initially, the risk scores are set to zero at the start of the experiment. The experts may assign risk scores while observing the participant completing the experiments (i.e. watching the training data as it is recorded and observing the participant) or may assign risk scores after the experiments using a playback of training data. Alternatively, the experts may record initial risk scores during the experiments and adjust the risk scores while observing the playback of training data. The training data may include sensor data (e.g. force and IMU data), digital media (e.g. video), and/or supplemental data over time. A graphical user interface (GUI) may be provided for the experts to review the training data of the participant over time. The experts may use their knowledge and experience to identify, from the training data and experiments, the time point where one or more fall contributors should be given a non-zero risk score. The non-zero risk scores are entered into the GUI. When the experts find that a fall contributor decreases or increases, the risk score is adjusted in the GUI. When the risk score is no longer present, the risk score is reset to zero. The playback of training data, including video, may be paused, rewound, run in slow motion, and/or zoomed in to observe the participant in further detail using the GUI. For example, the expert may review video of the participant's face or the feet more closely to gain further insight into the fall contributors of the participant. The expert may also review the other training data synced to a certain event or instant to decide on the risk scores. When the procedure is completed, the system automatically fills in the risk scores of all fall contributors using imputation or interpolation methods (e.g. smooth interpolation), which may then be modified by the expert if the change is too abrupt (e.g. a sudden onset of a gait condition caused by some joint movement reaching its limit).

The training database may include training data from experiments where no fall occurred. For example, the participant may perform the ambulatory activity and not experience any potential fall conditions (e.g. for a participant without a fall tendency). During a non-fall experiment, the expert may assign risk scores of 0 for each fall contributor throughout the experiment. Non-fall experiments may also be valuable for training the machine learning model. For example, the training database may have approximately equal numbers of fall experiment training data and non-fall experiment training data. The fall and non-fall experiment training data may be used to train the machine learning model on how to recognize and differentiate between fall and non-fall conditions.

Instead of one single expert, a group of experts may be used to increase the accuracy of the machine learning model training. The group of experts may collaborate or may check each other's work to come to a decision on risk score assignments. For example, one expert may start by assigning risk scores and then pass the results to another expert to review and alter the scores. In a further example, multiple experts may discuss and decide on risk score assignments together.

The GUI may extract the required data from the training database and display the data in the form of sliding graphs or spreadsheets. The GUI may also have more powerful case retrieval functions to improve the machine learning model training. For example, the GUI may search the training database to find a time interval where the force, kinematics and kinetic values have similar variations or patterns as the current experiment. The retrieval function may allow the experts to compare similar cases between participants to make more consistent risk score assignments. The cases in the training database with similar variations or patterns in values may be presented to the expert for analysis. The expert may then use the risk scores assigned to those cases as a reference for risk score assignment on the current case. For systems trained previously by earlier experiments, the expert may also review the machine learning model parameters that have been found. For example, the GUI may display the risk scores of the fall contributors found by applying the latest parameters of the machine learning model on the new experiment data. The expert may then choose to copy those scores if the fall scenario is similar or replace them if the fall scenario is different. Additionally, the expert may choose to keep the risk scores of some fall contributors the same and change the risk scores of other fall contributors.

A training database contains the various types of training data used to train the machine learning model. The training database may include empirical data and synthesized data. Empirical data may be acquired from a diverse set of participants. To reduce the number of actual participants needed to train the system, synthesized data may be created by randomly varying the empirical data. Varying the data series to provide synthesized data may be done through random time shifting, random magnitude scaling, random pattern changing or other approaches to varying a dataset. Random time shifting uses a smoothed series of random time translations applied to each time data point in a data set. Random magnitude scaling works similarly, whereby a smoothed scaling value is applied to each sensor data point. Random pattern changing is accomplished by making minor perturbations to the spectral amplitudes of the data set. These perturbations may be made globally to the entire data series (e.g. with a Fourier Transform, etc.), or locally (e.g. with the S-Transform, etc.). Other approaches to synthesizing data from empirical data may include making minor smoothing adjustments to the time-axis, magnitude, and local and global frequency spectrum such that said synthesized values simulate variations in performance of activities of the same type. Use of synthesized data may mitigate overfitting of the NN by non-diversified training data.

The synthesized training data may facilitate preparing a system for use in characterizing activities of a given subject with less empirical data. For some machine learning models, such as a deep learning network, a large training database may be needed to train the parameters. Application of synthesized training data may reduce the number of subject training sessions based on the confirmation input required before using the system for fall prediction. The synthesized data can balance the training data to introduce diversity, such that the distribution of training data is less biased toward the aggregate trends of the participants in the database. In some cases, the training database may display trends that are not representative for the subject or for a broader population than that in the training database (e.g. the training database may have a disproportionately large representation of participants with hip injuries, etc.). Large amounts of training data can be synthesized for any selected population with a fall risk, based on empirical data of the selected population with a fall risk to base the synthesized data on. Using the synthesized data may reduce the amount of empirical data necessary to train a machine learning model for use on a given subject. Using the synthesized data may also mitigate over-fitting of the machine learning model.

Training may be an ongoing process for the machine learning model. The machine learning model may be initially trained with a limited number of participants and training data. The system may then be used by the subject. Follow-up experiments may be performed at a later time and the new training data may be added to the initial training data to create a larger training database for training the machine learning model. For example, an experiment may be performed with 50 participants each performing 10 walking experiments. Over the 500 experiments, only 100 experiments may have resulted in falls. A similar or approximately similar number of experiments without a fall may be chosen to train the machine learning model (e.g. 100). The 200 experiments (i.e. 300 experiments are not used) are included in the first training database and are used to train the machine learning model, resulting in a first version of parameters and outputs. A month later, a different group of participants and 300 experiments (i.e. approximately 150 fall experiments and 150 non-fall experiments) are collected and added to the training database. The second training database may be used to the machine learning model, resulting in a second version of parameters and outputs. The second version of parameters and outputs may be more accurate or an improvement over the first version. The first version of parameters and outputs may be used as the starting point for training the second version of parameters and outputs.

As mentioned above, the input data (i.e. the data that is input into the machine learning model) may include raw measurements and/or processed measurements. Processed measurements may be standardized to lie within a designated range before entering the first layer of the machine learning model. Measurements may only be standardized for certain types of machine learning algorithms (e.g. NNs). Data of the same form, type and nature may be standardized with the same method, for example, using the mean (m) and standard deviation (σ) of all input data. After normalization, a value (x) will become standardized value (x'), as seen in the equation below.

$$x' = \frac{x - m}{\sigma}$$

The standardized value (x') may be input into the network for forward propagation. During back propagation, the standardized value (x') may be destandardized back into a value (x) using a back propagation equation, shown below.

$$x = (x' * \sigma) + m$$

Some of the machine learning algorithms in the machine learning model may require larger amounts of training data (e.g. DLNN). Precise data may not be required for all the training data to accurately train the machine learning algorithm. The training data not requiring precise data may undergo short cut methods to reduce the processing power or labour required to produce the outputs. Short cut methods may include, reducing the granularity of the training data, reducing the data rate of the training data, using interpolation, using approximation, or some combination thereof. Particularly, the short cut methods may be used to fill in uneventful intervals between events (i.e. when risk scores are assigned non-zero values).

Figure 3:
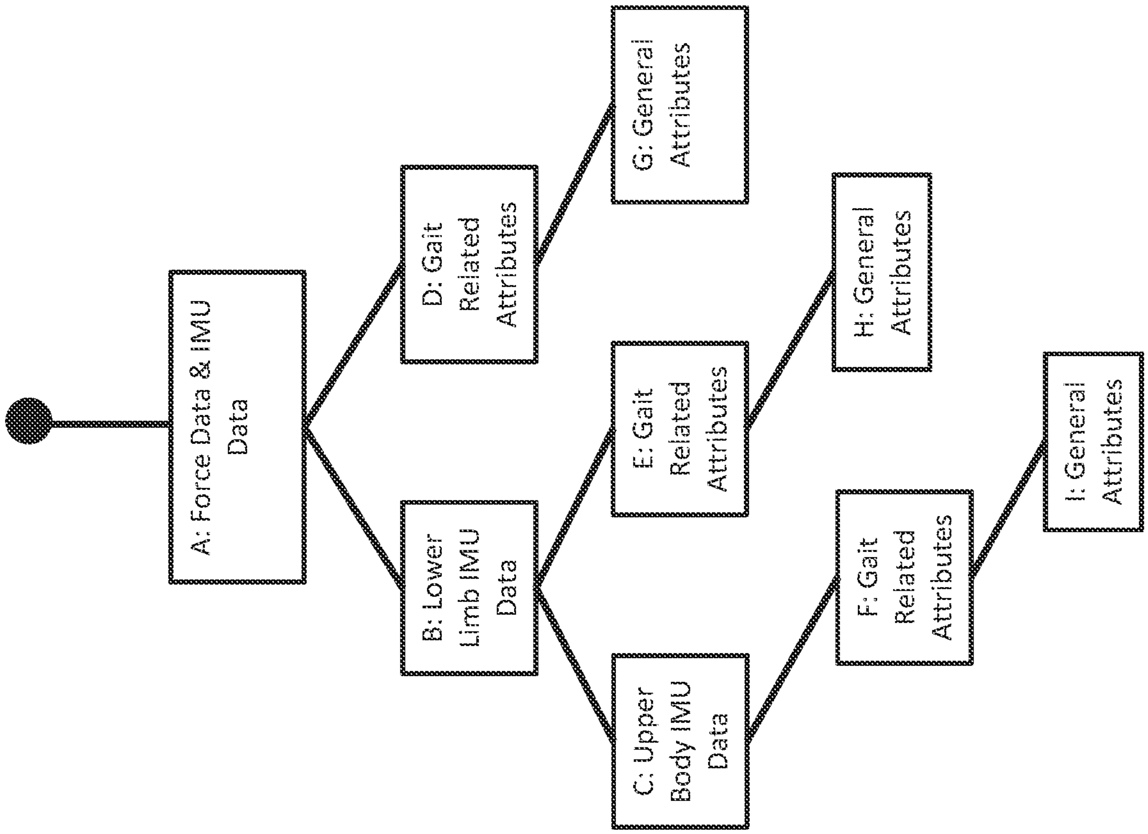
FIG. 3 is a flowchart showing an example of a hierarchy of deep learning neural networks.

FIG. 3 shows an example machine learning model with a hierarchy of machine learning algorithms. As described above, the machine learning model may include more than one machine learning algorithm or more than one combination of machine learning algorithms because there may be different systems with varying amounts and types of input data. The input data may vary depending on the types of sensors, the locations of sensors, and the types of supplemental data being used. A single machine learning algorithm or single combination of machine learning algorithms may, in some instances, not work for all cases. Each of the machine learning algorithms or combinations of machine learning algorithms may be trained using training data recorded while a participant performs the ambulatory activity. The training data may be used to determine the parameters, and the parameters are employed during use to generate fall prediction data. The machine learning model may be trained using a hierarchy of machine learning algorithms, which includes at least one high machine learning algorithm or combination of machine learning algorithms and at least one low machine learning algorithm or combination of machine learning algorithms. The hierarchy of machine learning algorithms may be developed using the input data rankings.

The input data may be ranked from most important in generating the fall prediction data to least important in generating the fall prediction data. The importance in generating fall prediction data may be determined by analyzing the ability of the input data to predict an imminent fall accurately and consistently. In the example shown, the most important input data is the series of force data from the plurality of force sensors worn on the subject's foot over the time window and the series of IMU data from the first IMU worn on the subject's foot over the time window. Therefore, the force data and IMU data are assigned a higher place in the hierarchy than the supplemental data. In the example shown in FIG. 3, the most important input data in generating fall prediction data after the series of force data and the series of IMU data is kinematic data, then kinetic data, then gait-related attributes, and general attributes. Kinematic and kinetic data at the current instant and statistics and feature extraction of force data, kinematic data, and kinetic data before the current instant (collectively referred to herein as "kinematic data, kinetic data, statistics and features") are not shown as separate machine learning algorithms or separate combinations of machine learning algorithms in the hierarchy because each value is, in the example shown, directly determined from at least one of the series of force data and IMU data. Kinematic data, kinetic data, statistics, and features can be calculated in each of the machine learning algorithms or combinations of machine learning algorithms of the hierarchy because the highest machine learning algorithm or combination of machine learning algorithms has input data that includes force data and IMU data from sensors worn on the subject's foot. In the example shown, kinematic data, kinetic data, statistics, and features are considered part of the machine learning algorithm or combination of machine learning algorithms for each sensor location; but in other examples they may be included as a part of their own machine learning algorithm or combination of machine learning algorithms in the hierarchy. In one example, the hierarchy may be used for a machine learning model with more than one DLNN. Each DLNN may represent a different set of inputs depending on the training data available. The following description of FIG. 3 uses the machine learning model with multiple DLNNs.

The system is preferably trained using multiple sensors for each participant. When training the machine learning model, there may be more training data required to train a DLNN higher in the hierarchy (e.g. DLNN A) than the DLNNs lower in the hierarchy (e.g. DLNN H). The parameters in a higher DLNN may be more accurate (i.e. inputs with smaller error) because more training data is used. However, higher DLNNs may accept limited types of inputs. Lower DLNNs may be used for cases with more data types, which may provide more accurate fall prediction, but may also have less training data (e.g. more data removed because of errors or lack of experimental learning). The lower DLNNs may use the same training data as the DLNNs higher in the hierarchy, while adding additional input data from the experiments. To solve the trade-off between number of data types and amount of training data, the parameters between DLNNs lower and higher in the hierarchy may be frozen or initialized. Freezing or initializing the higher DLNN parameters may save time, simplify the training process, and increase the accuracy of fall prediction data. When training a DLNN lower in the hierarchy, the parameters of the higher deep learning network may be frozen and remain unchanged in the lower DLNN. To implement the freeze, the DLNN highest in the hierarchy may be trained first with all experiments, including the experiments with and without supplemental sensors (e.g. on the lower limbs and shoulders). For example, the highest DLNN may be trained with the largest amount of training data and may have a fully connected (FC) layer with the parameters, which may be more reliable and accurate. The parameters from the highest DLNN may then be frozen and established for DLNNs lower in the hierarchy. Now, when a lower DLNN is trained with frozen parameters, the frozen parameter values are not updated during back propagation of the training process. The back propagation is instead abruptly stopped at the output. As an alternative to a full freeze in parameters, some parameters may be initialized and adjusted based on additional training data. Initializing may work for parameters that are already established in higher DLNNs but may be altered based on their potential dependence on additional supplemental data. For example, the highest DLNN may be trained with the largest amount of training data. The parameters from the highest DLNN may then be initialized as the same values for DLNNs lower in the hierarchy. Now, when a lower DLNN is trained with initialized parameters, the initialized parameter values have a starting value to be adjusted during back propagation of the training process, which may require less processing power.

The examples of DLNNs described below use frozen and/or initialized parameters; however, the system may not necessarily include frozen or initialized parameters. Instead, the system may also be trained with unfrozen parameters to continuously adjust the DLNNs lower in the hierarchy as more training data for supplemental sensors is added. Also, the system may be initially trained during experimentation, but once the system is used, the system may continue learning from use data over time to predict falls more accurately for the specific subject. Alternatively, some parameters may be frozen or initialized and others may be left unfrozen as the DLNNs lower in the hierarchy are being trained.

FIG. 3 shows an example of the DLNN hierarchy. In the example shown, the highest DLNN is DLNN A, which includes the series of force data from the plurality of force sensors (e.g. force sensors 110) and the series of IMU data from the at least one IMU worn on the subject's foot (e.g. IMU 114). As previously described, DLNN A may also include kinematic data, kinetic data, statistics, and features determined from the force and IMU data from the subject's foot. The branches of the hierarchy represent cumulative additions of input data. DLNN B branches from DLNN A and includes the addition of one or more IMUs on the lower limbs. DLNN B includes force data from the subject's foot, IMU data from the subject's foot, IMU data from the subject's lower limbs, and kinematic data, kinetic data, statistics, and features from lower limb sensor data, foot sensor data, or some combination thereof. DLNN C branches from DLNN B and includes the same inputs as DLNN B, but with the addition of one or more upper body IMUs. The inputs of DLNN C include the additional IMU data from the subject's upper body and kinematic data, kinetic data, statistics, and features from the upper body sensor data, lower limb sensor data, foot sensor data, or some combination thereof. DLNNs D, E, and F branch from DLNNs A, B, and C, respectively, and include the addition of gait-related attributes. DLNNs G, H, and I branch from DLNNs D, E, and F, respectively, and include the addition of general attributes. In the example shown in FIG. 3, the general attributes are not added as an input without already having gait-related attributes as an input because the gait-related attributes are more important for generating fall prediction data than the general attributes. Each of the DLNNs in the hierarchy are described in further detail, below.

Although FIG. 3 shows a specific framework for a hierarchy, alternative hierarchy frameworks may be used to predict falls. As research and experimentation are completed, the hierarchy may be adjusted to accommodate different types of sensors, locations of sensors, and types of supplemental data that may improve fall prediction accuracy. Different types of supplemental data may be included or removed and/or the supplemental data may be ranked differently. In general, the input data to the highest DLNN (i.e. DLNN A) may include the series of force data from the plurality of force sensors worn on the subject's foot and, the series of IMU data from the at least one IMU worn on the subject's foot. Additionally, the DLNN may not be the only machine learning algorithm that is used in the hierarchy. Any appropriate machine learning algorithm or combination of machine learning algorithms may be used instead of DLNNs. For example, the hierarchy may contain random forests or a combination of a random forest and DLNN, where random forest A is the highest in the hierarchy and is trained using the series of force data from the plurality of force sensors (e.g. force sensors 110) and the series of IMU data from the at least one IMU worn on the subject's foot (e.g. IMU 114), as well as the kinematic data, kinetic data, statistics, and features determined from the force and IMU data from the subject's foot. Random forest B may include the addition of IMU data from an IMU on the lower limb, and so forth for the rest of the machine learning algorithms in the hierarchy.

Figure 4:
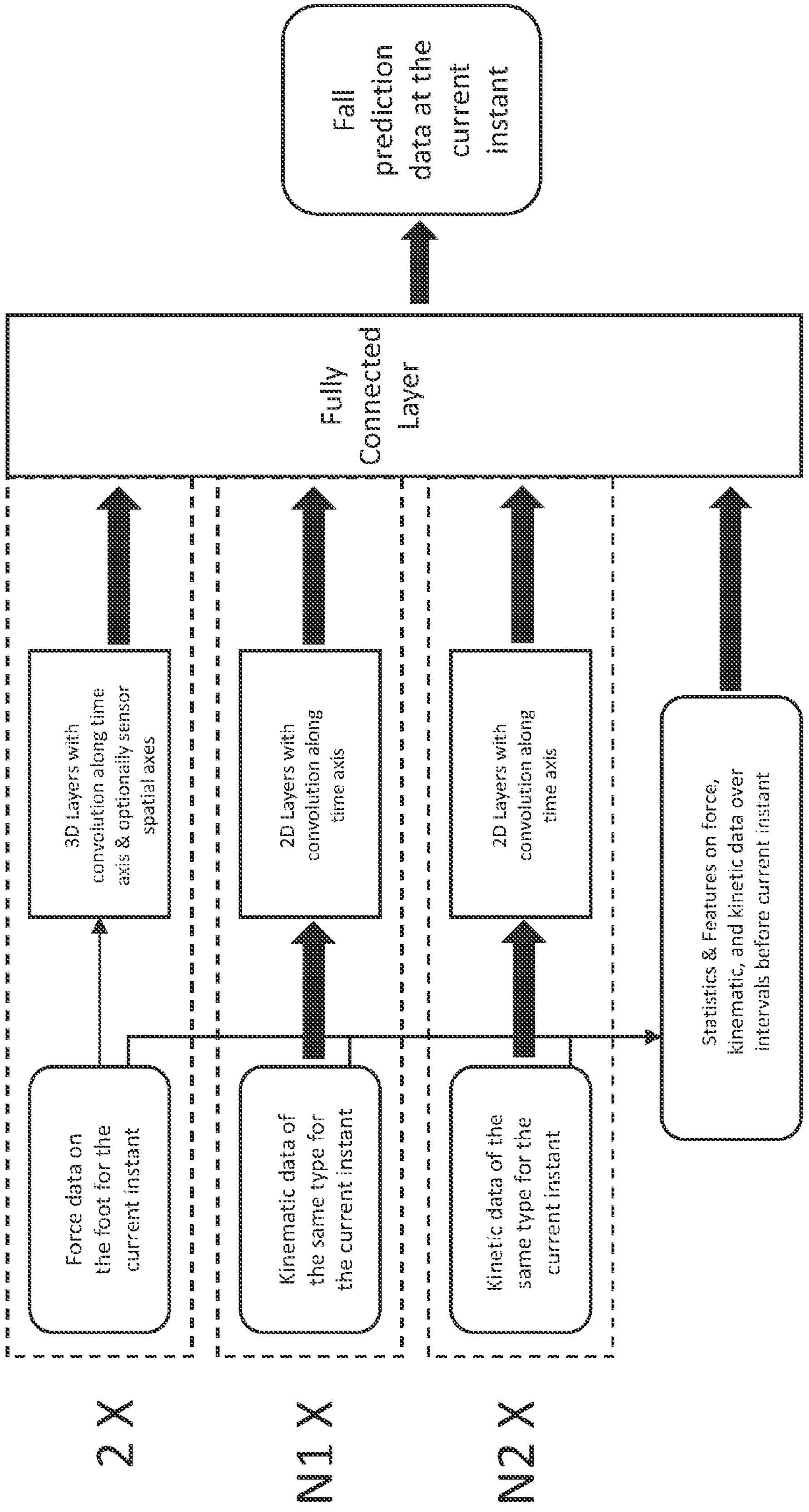
FIG. 4 is a schematic diagram showing an example of deep learning neural network A of FIG. 3.

FIG. 4 shows an example schematic diagram of DLNN A. In the example shown, DLNN A is the highest in the hierarchy and therefore contains the least number of inputs. The inputs for DLNN A are the series of force data from the force sensors worn on the subject's foot (e.g. force sensors 110) over a time window and the series of IMU data from at least a first IMU worn on the subject's foot (e.g. IMU 114) over the time window. For a system with two insoles, the force subnetwork may be multiplied by 2, which is shown by the dashed line rectangle around the force subnetworks. The curved-corner boxes are used for the various types of input data, and the 90-degree corner boxes are used for the processes used to process the linked input data. The thicker arrows linking inputs and processes represent a many-to-many link (i.e. the parent variable has several linked child variables and vice versa). The force data is processed using 3D layers for the 2D array of forces on each foot at the current instant, with convolution along the time axis and optionally along one or two sensor spatial axes. The convolutional subnetwork for force data may consist of several (e.g. typically 4) 3D convolutional layers. One dimension may be the time axis, and the other two may be the spatial x and y axes of the sensor positions. The length (l) of the time window may cover a few steps to obtain accurate data (e.g. up to 15 seconds, or between 1 seconds and 15 seconds, for example 3 seconds). The size of the input layer in each dimension may also depend on the measurement rate I and the number of force sensors. Between layers, there may be time convolution (e.g. with a typical filter size of 5), and the spatial convolution (e.g. with a typical filter size of 3 and 2) along the x (AP) and y (ML) axes, respectively. The force sensors 110 may be arranged in rows, where the sensors in adjacent rows are not required to be directly aligned. Although the first few layers of the subnetwork may model the relationship between adjacent sensors, the last few layers are the characteristics of the front, rear, medial and lateral forces. For an insole with very few sensors (e.g. less than 10), then the sensors may not be arranged in a grid and a subnetwork with 2D convolutional layers may be used instead. The 2D convolutional subnetwork may have time as one dimension and force sensors as the other dimension. There may be no convolution on the sensors, instead the sensors may be treated as a vector of values in the second dimension, which may be treated as a FC layer. The spatial configuration of the force sensors may not be utilized in the subnetwork but may still be trained to extract their mutual relationship. The two sets of outputs of the subnetworks for the two feet may be concatenated and input as a portion of the FC layer.

In the example shown, the second set of subnetworks is kinematics, which is ranked second most important for generating the fall prediction data. Kinematics may be determined from the IMUs worn on the subject's foot over the time window. For kinematics, there may be N1 subnetworks each with 2D layers for the kinematics values at the current instant, where N1 is the number of kinematic value types. For example, for kinematic values in the form of angles of rotation, linear velocity, linear acceleration, and angular velocity, N1 is 4, and there are 4 subnetworks. If the system does not use kinematic data as an input to the DLNN, N1 may be 0. Convolution may be used along the time axis within each kinematics subnetwork. Alternatively, an ordinary full connection may be used in other dimensions of kinematic value types that are not time-series-based. Another set of subnetworks for DLNN A is kinetic data, which is determined using data from the IMUs and plurality of force sensors worn on the subject's foot. For kinetic data, there may be N2 subnetworks each with 2D layers for the kinetic values at the current instant, where N2 is the number of kinematic value types. For kinetic data, convolution may be used along the time axis, or ordinary full connection in the other dimension of kinetic value types. In FIG. 4, the convolutional layers for kinematic and kinetics in the subnetworks are 2D, with one dimension being the time axis. For kinematics and kinetics subnetworks, a typical convolution filter size may be 5. The second dimension may not be convolutional and instead, may be a vector of all the values of the same type, like an FC layer in the second dimension. The two sets of N1 or N2 outputs of the subnetworks for all the value types may be concatenated and become a portion of the input into the FC layer.

In the example shown, the next set of inputs are the statistics and features extracted from the force, kinematic, and/or kinetic data values over intervals before current instant. The statistics and features subnetwork uses training data from the other three subnetwork inputs including force data, kinematic data, and kinetic data. The statistics and features may be directly input into the FC layer in DLNN A.

Finally, the outputs of the subnetworks may all be concatenated and input into the last FC layer. The output of the FC layer is the fall prediction data at the current instant (e.g. the fall contributor risk scores). The fall prediction data is generated for the fixed moving time window for each current time point. The machine learning model may be trained by all experiments that occurred during machine learning model training, since all experiments may include force and IMU data from the subject's foot. The resulting parameters for the DLNN A subnetworks and FC layer may be the most established of the DLNNs in the hierarchy because of the high amounts of training data.

Figure 5:
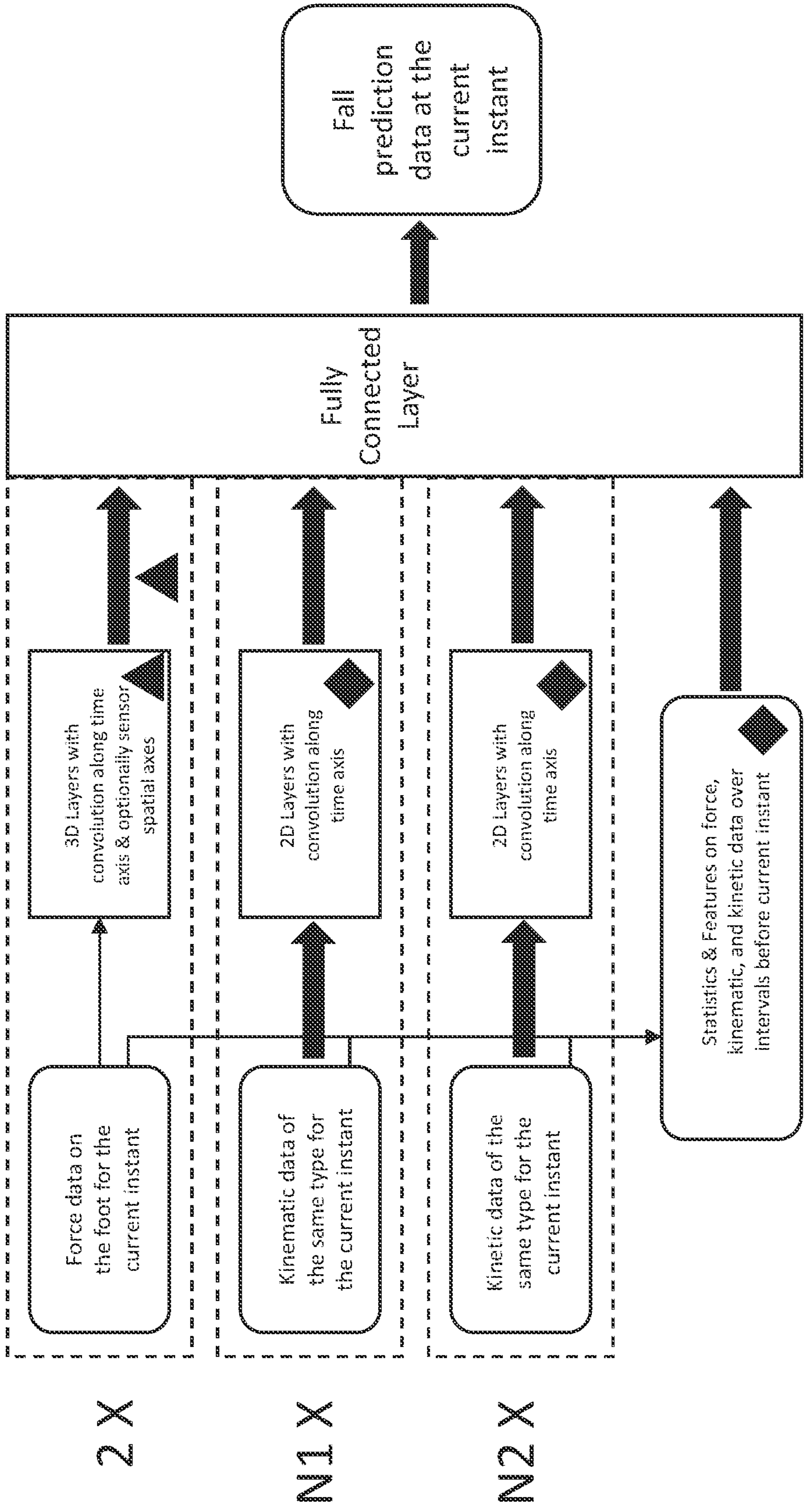
FIG. 5 is a schematic diagram showing an example of deep learning neural networks B and C of FIG. 3.

FIG. 5 shows a graphic of DLNNs B and C. In the example shown, DLNNs B and C have the same inputs as DLNN A, with the supplemental data from the at least one IMU on the lower limb for both DLNNs B and C, and additional data from at least one IMU on the upper body for DLNN C. For DLNN B, there may be fewer experiments with lower limb IMU data than the experiments used in DLNN A. For DLNN B, the parameters learned during training for DLNN A are frozen. Complete frozen parameters are represented as a triangle and partially frozen parameters are represented by a diamond. For example, the complete frozen parameters may include the parameters for the 3D layers for the foot convolutional subnetwork and the parameters between the force subnetworks and the FC layer. Partially frozen parameters include parameters established by data inputs from higher DLNNs and updating parameters involving inputs not in higher DLNNs. In FIG. 5, partially frozen parameters for DLNN B include frozen parameters for the foot sensors only, not the parameters that use inputs from the lower limb IMU or a combination of the foot and lower limb IMUs. For example, partially frozen parameters for DLNNs B may include the parameters in the 2D layers for kinematic and kinetic subnetworks, including the statistics and features of kinematic and kinetic data not including any data inputs from lower limbs sensors. For DLNN C, the partially frozen parameters include the parameters from the foot sensors only, the lower limb IMUs, and some combination thereof. The partially frozen parameters for DLNN C do not include any parameters using inputs from the upper body IMU. For example, partially frozen parameters for DLNN C may include the parameters in the 2D layers for kinematic and kinetic subnetworks, including the statistics and features of kinematic and kinetic data, not depending on any data inputs from upper body sensors.

After the parameters from previous DLNNs (i.e. higher in the hierarchy) are frozen, the remaining parameters are trained. The kinematic and kinetic data are determined from the additional lower limb IMU(s) for DLNN B and the lower limbs and upper body IMU(s) for DLNN C. Also, the statistics and features from the supplemental data added to each respective DLNN may also be concatenated into the input vector of the FC layer. The outputs of DLNNs B and C are the fall prediction data at an instant, which may differ from the outputs of DLNN A because of the additional training data. For example, DLNN B and C may have different risk score assignments, types of fall contributors, amounts of fall contributors, types of fall prediction data, experts training the system, and/or methods of training the system.

Figure 6:
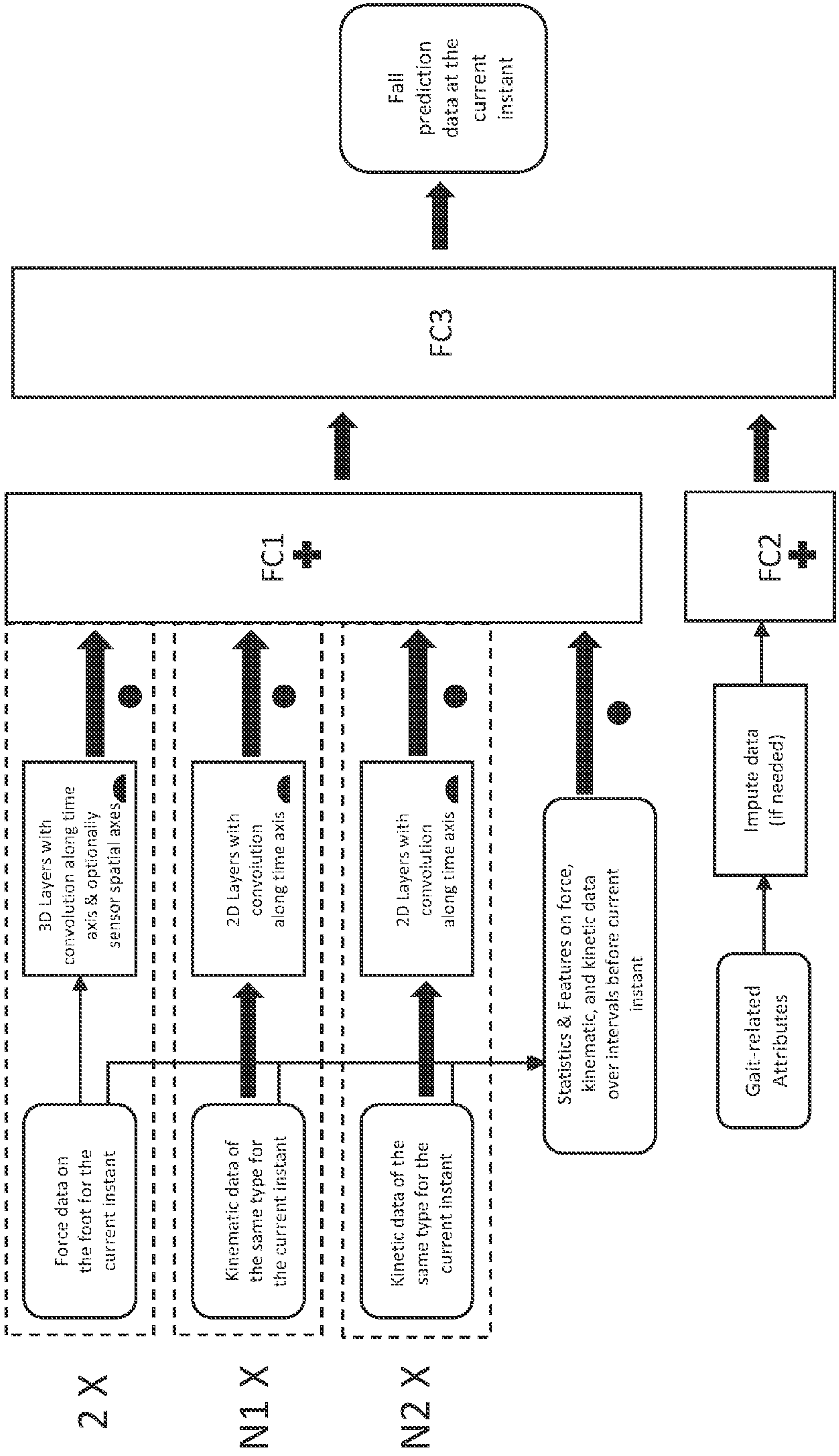
FIG. 6 is a schematic diagram showing an example of deep learning neural networks D, E, and F of FIG. 3.

FIG. 6 shows a schematic diagram of DLNNs D, E and F. In the example shown, DLNNs D, E and F, have gait-related attributes in addition to the force data, kinematic values, kinetic values, statistics, and features from sensors worn on the subject's foot (and lower limb for DLNN E and upper body for DLNN F). Only experiments with gait-related attributes may be used to train DLNNs D, E, and F, which may be fewer than higher DLNNs. FIG. 6 shows optional additional FC layers (represented by a cross), FC1 and FC2. In the example shown, gait-related attributes may be imputed to obtain any missing or incomplete data and the subnetwork may be inputted into FC2. The force, kinematic, kinetic, statistics, and features data may be concatenated and inputted into FC1. FC1 and FC2 may be inputted into FC3, which is the FC output layer trained to output fall prediction data for the current instant. To implement the freezing strategy, the parameters may be frozen for some layers. The frozen parameters may be determined from the corresponding connected DLNNs. Corresponding connected DLNNs refer to two DLNNs connected by a line in FIG. 3, particularly the DLNN next lowest in the hierarchy.

Some parameters in DLNN D, E, and F may be initialized instead of frozen. Initializing may work for parameters that are already established in higher DLNNs but may be altered based on their potential dependence on the added gait-related attributes. For example, some convolutional subnetworks may have initialized parameters in corresponding connected DLNNs A, B or C at the beginning of training, which are updated by the experiments in back propagation. The circle symbol represents a subnetwork or connection where the parameters are initialized for learning. For example, in DLNNs D, E, and F the parameters between the subnetworks and FC1 are initialized for learning. The semi-circle symbol represents a subnetwork where the parameters in the first few layers are frozen, and the parameters in the last few layers are initialized. For DLNNs D, E, and F, the gait-related attributes may be used to influence the parameters of the force data 3D layers with a convolution subnetwork, kinematic data 2D layers with a convolution subnetwork, and kinetic data 2D layers with a convolution subnetwork. The parameters in first few layers of the subnetworks are frozen, while the last layers are initialized for learning. Therefore, some traits of higher DLNNs may be left in the lower hierarchy DLNNs.

In the example shown, FC1 and FC2 are optional because they may increase the accuracy of scenario modelling but may also induce overfitting. Overfitting is a phenomenon where the DLNN is too tailored to the training data and may not give accurate results for cases that deviate from the training set. During training, FC1 and FC2 may be kept or removed to determine which variation of FC layers results in the best performance of the system.

Figure 7:
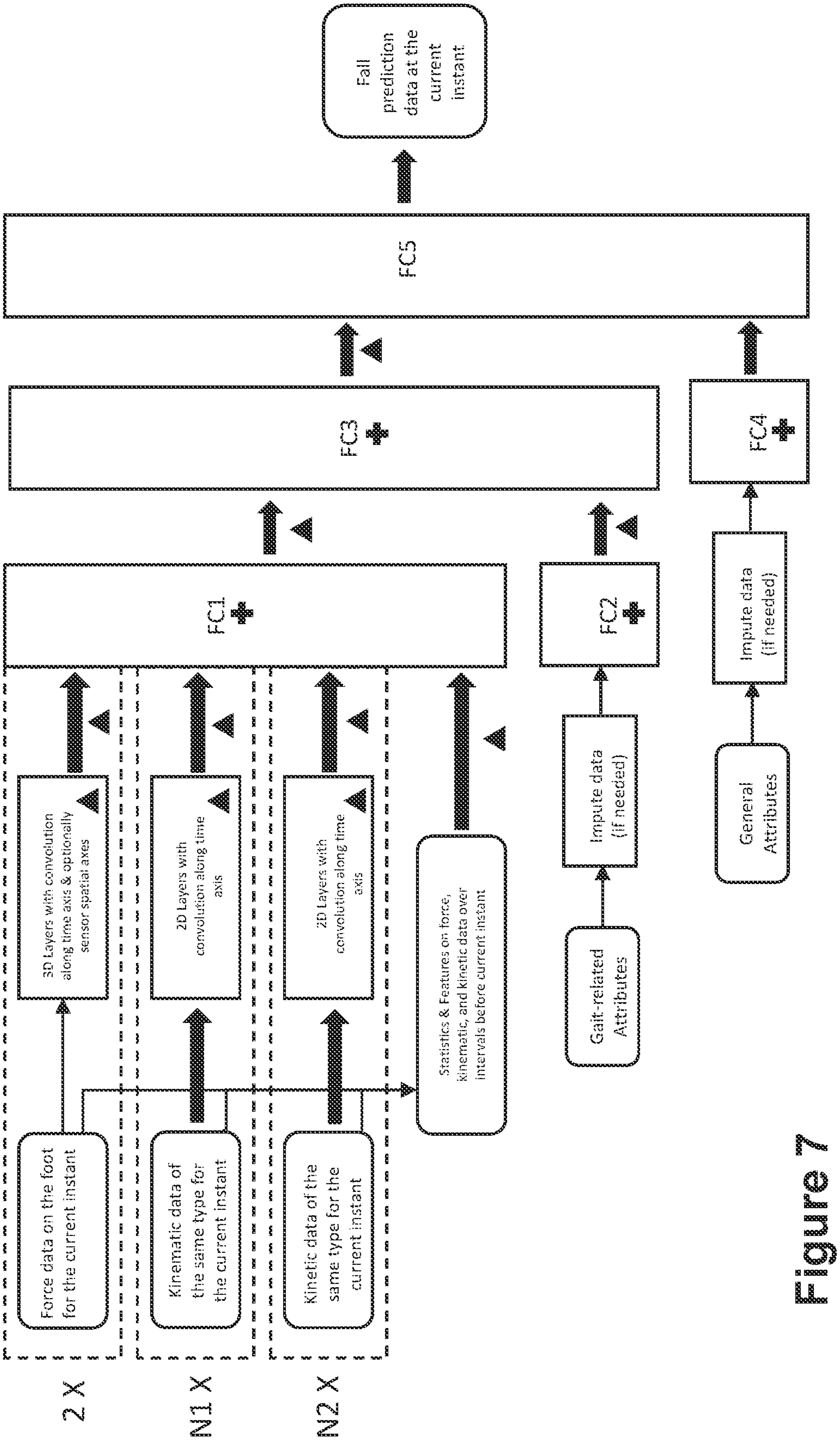
FIG. 7 is a schematic diagram showing an example of deep learning neural networks G, H, and I of FIG. 3.

FIG. 7 shows a schematic diagram of DLNNs G, H, and I. In the example shown, DLNNs G, H, and I are the corresponding connected DLNNs to DLNNs D, E, and F with the addition of general attributes. The number of experiments useful to train DLNNs G, H, and I may be fewer than for DLNNs D, E, and F and other higher DLNNs. The structure of DLNNs G, H, and I are similar to DLNN D, E, and F, with general attributes being included as a subnetwork. The general attributes may use imputation techniques to fill in any missing or incomplete data before being inputted into optional FC layer, FC4. The output layer is shown as FC5, which includes the subnetwork information from force data, kinematic data, kinetic data, statistics, features, and gait-related attributes.

Following the similar strategy to the previously described models, the parameters in DLNNs D, E, and F may be frozen in corresponding connected DLNNs G, H, and I, respectively. The frozen parameters may include the parameters inside the convolutional subnetworks and between the convolutional subnetworks and optional layers FC1 and FC2. Also, the parameters between FC1, FC2, and FC3 may be frozen. The general attributes may not be closely related to the gait or the time series of force, kinematic and kinetic values. Therefore, the parameters for the layers of the subnetworks from DLNNs D, E, and F may not be updated or initialized by higher DLNNs. FC1, FC2, FC3 and FC4 are optional. During training, the FC layer options may be added or removed to determine the combination of FC layers with the best resulting performance (i.e. higher accuracy for predicting an imminent fall).

Figure 8:
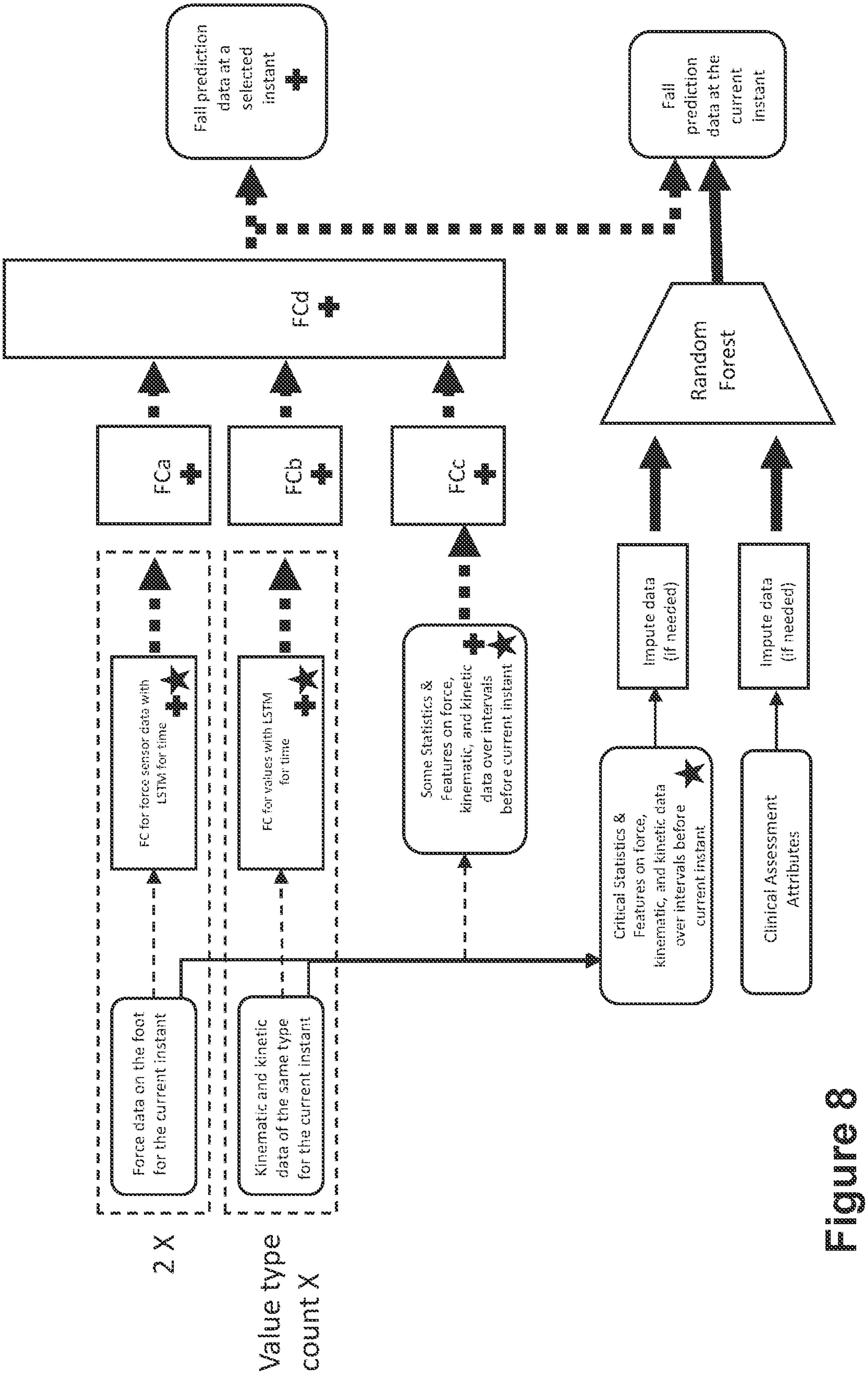
FIG. 8 is a schematic diagram showing an example of a random forest machine learning algorithm for fall prediction.

FIG. 8 shows an schematic diagram of an example random forest machine learning algorithm for predicting falls. Each decision tree in the random forest may be trained with a different sample of training data (e.g. using bootstrap aggregating) to reduce overfitting. An input to the random forest may include the set of critical statistics and features on the force, kinematic, and kinetic values, which are obtained from the series of force data from the force sensors worn on the subject's foot (e.g. force sensors 110) over a time window and the series of IMU data from at least a first IMU worn on the subject's foot (e.g. IMU 114) over the time window. In FIG. 8, kinematic data may be ranked second, kinetic data ranked third, and statistics and features ranked fourth in importance. However, each of the 1-4 ranked inputs may be dependent on each other and required to obtain the critical statistics and features that are input into the random forest. The critical statistics and features may be chosen from the larger list of statistics and features, wherein the critical statistics and features are designated as more important for predicting a fall. Another input to the random forest may include clinical assessment attributes. Both the critical statistics and features and the clinical assessment attributes may be imputed, if necessary, before being input into the random forest. The critical statistics and features and the clinical assessment attributes may be imputed if features and attributes are missing for some sets of training data.

The output of the random forest are the fall prediction data at the current instant, which may include the vector of risk scores for each fall contributor at the current instant. The fall prediction data is predicted based on the majority of votes (for a random forest classifier) or a type of averaging (for a random forest regressor) from each of the decision trees.

The example in FIG. 8 shows an optional DLNN, which may be combined with the random forest. The optional DLNN may be included with the random forest to automatically extract features of the force, IMU, and supplemental data. The automatic extraction of features may assist the random forest with learning the patterns of force, kinematic, and kinetic data used to produce fall prediction data. The training of the DLNN may not require the same precision as a lone DLNN (e.g. DLNN A in FIG. 3) because the optional DLNN in FIG. 8 only has an auxillary role in the machine learning model. As described above, the optional inputs and layers are represented with a cross. The optional process links are represented by dashed line arrows, with thicker dashed lines representing optional many-to-many links. The optional DLNN may be included to extract additional data from the series of force data and IMU data, which may increase the accuracy of the machine learning model. The inputs of the optional DLNN may be fed into a recurrent neural network, such as a long short term memory (LSTM) to extract the time-related features. The optional DLNN is not required because the critical data may already be captured by the inputs to the random forest. The output of the random forest may still provide accurate fall prediction data without the optional DLNN.

The inputs to the optional DLNN may include the series of force data from the force sensors worn on the subject's foot (e.g. force sensors 110) over a time window and the series of IMU data from at least a first IMU worn on the subject's foot (e.g. IMU 114) over the time window. A first set of LSTMs may be applied to the force data from the force sensors 100. For a system with two insoles, the force subnetwork may be multiplied by 2 (i.e. force data for each foot has a set of LSTMs), which is shown by the dashed line rectangle around the force subnetworks. The force data may have a 2D array of forces on each foot. The 2D force data may be processing using a convolutional layer before or inside the LSTM. The convolutional layer may be a 2D convolutional layer, with convolution along the time axis and/or along one or two sensor spatial axes. For example, the two dimensions of convolution may be the spatial x and y axes of the sensor positions. The length (l) of the time window may cover a few steps to obtain accurate data (e.g. up to 15 seconds, or between 1 seconds and 15 seconds, for example 3 seconds). The convolutional layers may be used to reduce the number of parameters in the optional DLNN and improve processing and training time. The convolutional LSTM may be built by linking the convolutional layer to the LSTM, by integrating them into a single layer (e.g. convLSTM), or by some other variant of the machine learning algorithm architecture. Convolutional layers may not be used in systems with fewer sensors or with sensors arranged in a non-grid format. The outputs of the LSTMs (e.g. vector of values) for the two insoles may be input into an FC layer (e.g. FCa).

The optional DLNN inputs may also include the kinematic and kinetic data calculated from the force and IMU data from the foot. The time-series kinematic and kinetic data may be input into the optional DLNN in vector form. The data rate (r) at which the force, kinematic, and kinetic data is fed into the optional DLNN may be larger than the data rate of the force and IMU sensors, themselves. The kinematic and kinetic data may be separated into data of the same value type and same unit. For example, the separate buckets of value types may include all the values representing time in seconds, all values representing distance in meters, and all values representing velocities in meters per second. The number of different value types is the multiplier for the kinematics and kinetics subnetwork. The kinematic and kinetic data may be fed into an LSTM. Each of the kinematic and kinetic values of the same value type may be input into a separate LSTM in the set of LSTMs. Each LSTM in the set may have a different granularity, depending on the value type. For example, an LSTM with miscroscopic features in sub-seconds range may have smaller granularity to capture the important details of the data. An LSTM with value types spanning several walking steps to uncover long-term features may have large granularity. Larger granularity may reduce the processing power required to train the optional DLNN. An LSTM with value types spanning only one to two steps may have medium granularity. The outputs from the LSTMs (e.g. vector of values) may be input into a FC layer for each kind of value type (e.g. FCb).

The next set of inputs into the optional DLNN may include statistics and features extracted from the force, kinematic, and/or kinetic data values over intervals before current instant. Some of the statistics and features (i.e. those not chosen as critical statistics and features) may also be determined for the force, kinematic, and kinetic data before the current instant. Some of the statistics and features may be directly input into an FC layer (e.g. FCc).

In the example in FIG. 8, the optional FC layers include FCa, FCb, and FCc for each of the groupings of data including force, kinematic with kinetic, and statistics and features. The output of the separate FC layers may be input into the final FC layer, FCd, which outputs the rough fall prediction data for a chosen instant. FCa, FCb, and FCc may not be included in other examples, instead the outputs from the various optional DLNNs may be input directly to FCd.

If the optional DLNN is included in the machine learning model, and trained before the random forest. The output from the optional DLNN may be a vector of rough fall prediction data (e.g. a vector of rough fall risk scores for various fall contributors) for a selected instant instead of the current instant. The outputs from the optional DLNN may then be input into the random forest.

The example in FIG. 8 may be included in a machine learning model with a hierarchy, such as the one included in FIG. 3. For the hierarchy, the random forest machine learning algorithm in FIG. 8 may be considered random forest A. Random forest A may include a combination of machine learning algorithms, such as a random forest with a DLNN, where each of the following random forests B, C, D, E, etc. include both a random forest and DLNN, as well. Random forest B branches from random forest A and may include the addition of one or more IMUs on the lower limbs. The additional data for each branch C, D, E, F, G, H, and I may be same as those described in FIG. 3. That is, the random forest in FIG. 8 includes the least number of inputs and may be considered the highest random forest in the hierarchy. Each branching random forest may include additional supplemental data as an input into the random forest, as more supplemental sensors are added or as more training data (e.g. gait-related attributes) are available.

After training the machine learning model, the inputs may be evaluated to determine their value in predicting accurate fall prediction data. For example, DLNN A, the parameters in the links from the nodes of the first input layer of a subnetwork may be observed. The input values of nodes with small links may have little effect on the final outputs of the DLNN and may be removed from the inputs. In another example, a node of the input layer of a machine learning model that is suspected to be less useful may be removed and a validation procedure may be used to check the effect. For example, a standard validation of 80% of the training data may be used for training the machine learning model and the remaining 20% may be used for testing the machine learning model. If removing the node for an input does not increase the error, then the selected node may be considered futile. The input selection tool may include iterative checks on the accuracy of the machine learning model. For example, the model may be trained and an accuracy baseline may be established, then noise may be added to an input and the accuracy may be checked again. The process may be repeated for other inputs to determine how the noise affects the accuracy of the machine learning model. The variance of the noise may be proportional to the variance of the input. Inputs with minimal effect on the machine learning model may result in minimal effect on the prediction accuracy when noise is added. The inputs with minimal effect may be removed from the machine learning model.

The machine learning model may be trained by a variety of participants and the subject using the system may not necessarily have been a participant being used to train the machine learning model. Since the system may be trained with a diverse set of participants, the machine learning model may recognize different types and modes of falling for various subjects.

After machine learning model training is complete, the system may be used to predict falls. For example, the subject may wear insole 100 during various activities, particularly ambulatory activities. During wear, a series of force data is obtained from the force sensors 110, and a series of IMU data is obtained from the first IMU 114, and the machine learning model employs the set of parameters to generate fall prediction data using at least the series of force data and the series of IMU data. An indication of fall prediction data is then output (e.g. using one or more output devices), for example in order to warn the subject (or third party) of or alert the subject (or third party) to an imminent fall.

The output device may be any device that can output an indication of fall prediction data. As used herein, the phrase "indication of fall prediction data" refers to any information that is based on the fall prediction data and that is presented to the subject or to a third party. For example, the output device may include a visual output device (e.g. a screen) and the indication of the fall prediction data may be a text or graphic alert of an imminent fall, the output device may be an auditory output device (e.g. a speaker) and the indication of the fall prediction data may be an auditory alarm that is issued when a fall is predicted to be imminent, and/or the output device may be a tactile output device (e.g. a vibratory device) and the indication of the fall prediction data may be a tactile stimulus that is delivered when a fall is predicted to be imminent. In some examples, more than one output device may be provided.

An output device in the form of a visual output device can be any suitable interface module that provides visual information. For instance, the display can be a cathode ray tube, or a flat screen monitor and the like if the processor and/or remote cloud server is part of a desktop computer. In other examples, the display can be a display suitable for a laptop, tablet, or handheld device, such as an LED or LCD-based display and the like.

The indication of the fall prediction data can include a visual display of raw data, alerts, statistics, reports, graphics, and/or other metrics. The output device may present the indication of the fall prediction data to the subject. Alternatively, the subject may opt not to use the output device, and the output device may instead present the indication of the fall prediction data to a caretaker, healthcare practitioner, and/or other third party. The caretaker, healthcare practitioner, and/or other third party may have access to the fall prediction data (or indication thereof) from a single subject or multiple subjects (e.g. a patient dashboard). In another example, the subject and the caretaker, healthcare practitioner, and/or other third party may have access to one of multiple output devices that may display the same or different system metrics. For example, the subject may receive alerts on a first output device, and a healthcare practitioner may receive weekly reports for the subject on a second output device to observe trends in the subject's fall prediction data.

As with experimental use, when the subject is using the system, the plurality of force sensors and IMUs worn on the subject's foot yield the series of force data and the series of IMU data, which is input into the machine learning model. For the most accurate detection, the system may be used for walking or sliding on a relatively level, non-slippery floor, and without walking aids or assistance.

In some examples, the machine learning model is targeted to a chosen group of subjects. For example, the targeted group may be the elderly, diabetics, and/or patients who recently underwent hip replacement surgery. For systems being used by multiple target subjects, the system may be built with a separate machine learning model for each group. Similarly, the system may be built with different machine learning models for different activity classes, such as walking, sliding, fast walking and running. The advantage of having individual machine learning models for each use case is a more accurate model.

During training, the machine learning model may employ transfer learning for training more than one targeted group. For example, the machine learning model may be trained using one targeted group (e.g. elderly men). Then, the machine learning model may be trained using a second targeted group (e.g. elderly women). That is, the parameters from the first targeted group machine learning model are initialized and used as the starting point for the training of the machine learning model for the second targeted group. The amount of training data (i.e. number of participants) in the second targeted group may not be as large as in the first targeted group. The transfer learning method may be applied for various target groups. For example, the target groups may include different participant demographics, disabilities, injuries, gait-related attributes, and mental health issues.

In a system with a hierarchy of machine learning algorithms or combinations of machine learning algorithms, the appropriate machine learning algorithm or combination of machine learning algorithms may be chosen based on the availability of input data for the subject. For example, if the subject is wearing force sensors and IMU(s) only on the foot and the subject's gait-related and general attributes are unavailable, then the system may be set-up with the machine learning algorithm or combination of machine learning algorithms with only force and IMU inputs from the foot (e.g. DLNN A or random forest A). During use, the subject walks or slides, and the force and IMU data is captured. The kinematic and kinetic values may be computed instantly, and the statistics and features may be determined for some time interval before the current time point. Also, the gait-related and general attributes may be included in the input data, if available. The input data is input into the chosen machine learning algorithm or combination of machine learning algorithms and may also be stored in a memory of the system. Using the input data and the parameters, the processing device may compute the fall prediction data by forward propagation. The indication of the fall prediction data may be output in real time and/or stored in the memory of the device.

The indication of the fall prediction data can include any information based on to the fall prediction data, presented in any way. As described above, examples include auditory alerts, visual representations (e.g. a visual display of a risk score), and tactile stimulation. The indication of the fall prediction data may be output in real time to continuously give feedback to the subject, caretaker and/or other third party. For example, particularly for fall prediction data that changes over time, the indication of the fall prediction data may include a display of numeric values or a graph. Also, when the fall prediction data is in the form of one or more risk scores of the various fall contributors, the indication of the fall prediction data can include a visual display of numerics, graphics, and/or color codes over time and/or at an instant. Real time displays may help the subject, caretaker and/or third party monitor the subject's condition in real time. The indication of fall prediction data may also include the real-time or non-real-time inputs into the machine learning model used to determine the fall prediction data.

In addition to outputting the indication of the fall prediction data in the form of a real-time visual display, the indication of the fall prediction data may include an alert, such as a fall risk alert. A rule-based system may be used to generate fall risk alert(s). For example, the fall prediction data may include at least one risk score, as described above. The processor may compare the risk score(s) to a threshold, and when the risk score exceeds the threshold, the indication of the fall prediction data may be output in the form of one or more alert(s). The alerts may be in the form of one or more of a visual, tactile, or auditory alert and may be included as a function of the first input device (e.g. the insole 100), a second input device, another wearable device, or an output device. For example, the alert may be a sound or visual display on a mobile device. The alert may direct the subject and/or caretaker to take an action to stop the imminent fall from happening. There may be several levels of alert depending on the degree of imminence of the fall, potentially manifested by a change in auditory, tactile, and/or visual alert. For example, a higher importance alert may be indicated by a louder volume or a brighter colour flash than a lower importance of alert. The type of alert may also be used to identify different fall contributors that trigger the alert. The alerts may also be specific to the subject. For example, an alerting system with tactile vibration instead of flashing lights may be designed for a subject with poor vision. The alert type may consider the duration, mean or maximum score of each fall contributor, and/or the aggregate scores of several fall contributors. The alert types and alerting rules may be revised as the system gains experience from the effectiveness of alerts. Alternatively, the system may use a machine learning system to automate the alerting rule generation. For example, the alerting rules may be created using a short-term recurrent neural network.

The subject, caretaker, and/or other third party may also be trained on how to react to the alerts and take immediate effective action to halt the imminent fall. Caretakers and third parties may include individuals who are nurses, doctors, insurance providers, home care assistants, adult children, or responsible individuals who are capable of caring for the subject. Examples of effective actions may include holding onto something or somebody, retrieving a walking aid, stopping the chosen activity abruptly or gradually, slowing down the movement, paying more attention to the motion, correcting the current gait by putting strength on the leg or leaning on the other side, or some combination thereof. The system may also record the effectiveness of the actions that successfully (or unsuccessfully) prevent a fall. The successful effective actions may continue to be recommended and unsuccessful effective actions may be abandoned in the future. The success of an effective action may be recognized by the system or may be input by the subject, caretaker, and/or other third party.

The system may also have the capability to detect when a fall has occurred (i.e. the system may retrospectively detect a fall in addition to prospectively predicting a fall). A separate machine learning model may be used for retrospectively detecting a fall. For example, when a subject, caretaker, and/or other third party is alerted to an imminent fall, the subject may experience a fall in the time taken to react to the alert. The system may be trained to retrospectively detect falls using the same input data as is used for predicting falls. For example, IMUs on the upper and lower limbs may already be implemented and the measurements from these sensors may be input into a separate algorithm or machine learning model that detects a falling motion and/or impact from a fall. The system may also alert a caretaker and/or third party when a fall has occurred using different visual, tactile and or auditory alerts. The system may also record the input data and fall prediction data leading up to the fall to improve coaching and feedback.

The output device may also be configured to provide coaching and/or feedback based on the fall prediction data. The output device may have built-in coaching to suggest effective actions or other aids for the subject to prevent the imminent fall. For example, the output device may employ another rule-based system that automatically suggests an effective action based on the fall prediction data and communicates the feedback to the subject by one or more of auditory feedback, visual feedback, and/or tactile feedback.

In another example, the alerting system may be tailored to the preferences of the subject, caretaker, and/or other third party. For example, the alerting system may bypass certain individuals to prevent over alerting for any one of the subject, caretaker, and/or other third party. The subject may choose not to receive any coaching or alerts, but instead have the alerts transmitted to the caretaker to monitor. The subject may also choose to tailor the alerting system to only alert a healthcare practitioner or third party when a fall has occurred, instead of when a fall is imminent.

The system may also be programmed to generate reports. The reports may be generated on a regular or regular-interval basis (e.g. daily, weekly, or monthly). The reports may be focused on the occurrence, frequency, likelihood, and seriousness of the fall contributors for the subject. The reports may include other data such as statistics, trends/summaries of fall prediction data, force abnormalities, device issues, and/or input data. The subject, caretaker, and/or other third party may opt to remove or add certain functions to tailor the reporting to the subject's health needs. The subject, caretaker, and/or other third party may use the reports as a tool to prevent or reduce the occurrence of fall conditions. For example, based on the types of fall contributors, a caretaker may suggest lifestyle changes, diets, alternative ways of walking/sliding, medication switches, physical aids (e.g. a walker), exercises, physiotherapy, and/or rehabilitation. The reports may also record the actions that successfully (or unsuccessfully) prevent a fall. The successful actions may continue to be recommended and unsuccessful actions may be abandoned in future.

The regular reports may also serve as a basis for long-term fall risk assessment. The system may use either some standard time series analysis, statistics methods, or a separate machine learning model for both long and short terms (e.g. an LSTM network).

Supplemental sensors may be included to improve measurement capacity for monitoring a wider range of information. As mentioned above, the supplemental sensors may include sensors capable of measuring temperature, global positioning system (GPS), proximity, heart rate, respiratory rate, blood pressure, temperature, blood oxygen saturation, blood flow, blood or environmental content quantification (e.g. glucose, electrolytes, minerals, oxygen, carbon dioxide, carbon monoxide, HbA1C, Ethanol, protein, lipid, carbohydrate, cortisol, lactate, pH, pro- and anti-inflammatory markers, MMPs, growth factors, bacterial content), hydration status/tissue turgor, joint position, features of gait analysis (including supination and pronation), device breakdown, pedometry, accelerometry, velocity, calorimetry, centre of gravity or centre of foot position, friction, traction, contact area, connectivity/insulation, EEG data, and/or ECG data.

In one example, a GPS device may be included in the system (e.g. in insole 100) to detect the location of the subject or predict any environmental terrain changes that may affect the subject. Similarly, a wall hub device may have a proximity sensor to detect the location of the subject within their home. A proximity sensor may also detect the movement of the subject. The system may indicate different alerts in locations where the fall risk is higher, such as kitchens, bathrooms, and stairs. The system may also indicate different alerts for areas with terrain where fall risk is higher, such as on gravel and steep hills.

In a second example, a heart rate monitor may be included in the system (e.g. in insole 100). Heart rate signals can show how a subject is responding to the conditions. For example, the quickening of a subject's heartrate may indicate nervousness caused by uncertainty in footing or terrain. The heart rate monitor may be used in the machine learning model training experiments to assist the experts with determining the risk scores of the various fall contributors. The heart rate may provide insight into the mental state of the subject, such as when the subject is concerned about a potential fall.

In another example, an ultrasound proximity sensor may be included in the system (e.g. in the insole 100 or in front of the subject's shoes). Ultrasound proximity sensors may indicate the likelihood of obstacles causing issues for a subject. The ultrasound proximity sensors may be compared to other data to understand how a subject responds to different obstacles (e.g. reaction time for change of direction), and which obstacles present a higher likelihood of causing a fall. The data from the ultrasound proximity sensors may be useful to experts when assigning risk scores for certain fall contributors.

To simplify the integration of the additional sensors, the system may include other sensorized wearable devices in addition to insole 100. The data from the additional sensors in the added sensorized device(s) may be time-synchronized and cross referenced with the data from the plurality of force sensors and IMUs worn on the subject's foot to provide further detail for predicting a fall. The data from the other sensorized devices may be input into the machine learning model hierarchy to improve the prediction of fall conditions.

In one example, the system may be trained and used with insole 100 and a smartwatch including an additional IMU. The raw or processed sensor data from the smartwatch may be time synchronized and added to the input data to the fall prediction machine learning model as an upper body IMU. Further, a subject may already be used to wearing a smart watch and may find it easier to use and wear on a regular basis without drastically changing their daily routines to accommodate the fall prediction method. Instead of attaching an IMU sensor to a part of their body, the subject may maintain the same routine of putting on their smartwatch every day, and still have the benefit of upper body IMU data for detecting and predicting falls.

In another example, the system may be trained and used with data from smart glasses. The sensor data from the smart glasses may include IMU data, limb movement tracking data, eye movement tracking data and/or digital media. The digital media may include video of the eyes of the subject, which can be used to capture eye movements and motions that may be an indicator of an imminent fall. The data from the smart glasses may be integrated into the training experiments and/or the machine learning model.

In a third example, the subject may be living with diabetes and have a continuous glucose monitor (CGM) attached their body. The data from the CGM may be time synchronized and cross referenced with other sensor data to detect indicators of imminent falls in training experiments and/or the machine learning model. Particularly, the CGM may indicate periods of use when the subject has low blood-sugar. A common symptom of low blood-sugar for diabetics is wooziness or dizziness, during which, a fall is more likely to occur. For example, during periods when the CGM data shows low blood sugar, the system may indicate a higher risk score for the dizziness fall contributor or may have a lower alerting threshold for imminent falls.

The sensors and wearable devices used in the system may also have additional purposes, outside of the fall prediction and/or fall detection use. The subject may have an acute chronic illness or other medical ailment that can be monitored using the same sensors and/or wearable devices included in the system. For example, a subject prone to falls may also experience peripheral neuropathy, which is a common symptom for subjects with diabetes. The insole 100 may also be used to detect force concentrations on the bottom of the foot, which may indicate the early stages of a diabetic foot ulcer. One such method for predicting diabetic foot ulcers is described in U.S. patent Ser. No. 10/004,428 (Everett et al.), which is incorporated herein by reference in its entirety.

Other sensors may also be used to manage or monitor symptoms of acute or chronic illness. For example, temperature sensors may be included in insole 100 to improve the accuracy of detection by also collecting temperature data at the bottom of the subject's foot, which may indicate inflammation leading to a diabetic foot ulcer. Also, the subject may want to monitor other body functions, physical activities, or movements. For example, the plurality of force sensors may be used to detect and record the number of steps the subject has taken during use of the system. The system can measure the subject's number of steps, while simultaneously implementing the machine learning model to predict imminent falls. The output device may display the number of steps and the indication of fall prediction data.

In another example, the system may measure conditions for standardized clinical tests for determining fall risk. The standardized clinical tests may be included as a chosen activity during training, instead of being quantified as supplemental data values (i.e. as clinical assessment attributes). The participants may be asked to complete standard clinical tests while wearing insole 100 during training experiments. The training data may be used to train the machine learning model to recognize the standardized clinical tests. Once the standardized clinical tests are completed, the plurality of force sensors, IMUs and any additional sensors may be trained to recognize the conditions for the standardized clinical tests, during use, the system may be trained to recognize similar conditions for the subject's daily life and generate fall prediction data based on the completion of the standardized clinical test. For example, while wearing insole 100, the subject may stand-up after fully sitting for a period of time and may repeat the stand-up action several times throughout the day. Data collected during the sit-to-stand motion (e.g. COP asymmetry and IMU trunk tilt) may be used as a input data for the machine learning model to determine the risk scores for the subject (e.g. risk score for the standardized clinical test fall contributor). The system may recognize that the sensor data for the stand-up motion is similar to the sit-to-stand balance test and the data may be used to determine risk scores, or the results may be included separately in the reports and/or display. The sensor data from the stand-up motion may also be compared to a baseline data for a specific subject to determine if improvements or progression has occurred. Additional data may be combined with the standardized clinical test data to provide more comprehensive indications of fall prediction data. For example, data from a GPS may be combined with the standardized clinical test data to automatically detect standardized clinical tests performed in similar locations. In another example, data from a digital clock may be combined with the standardized clinical test data to automatically detect standardized clinical tests performed at similar times of day. The fall prediction data may be compared and the resulting risk scores may consider the environmental context of the subject using the system. The system may also provide feedback on why the standardized clinical test results for the subject were good or poor and provide instruction on how to improve standardized clinical test results as part of the indication of fall prediction data.

While the above description provides examples of one or more methods, systems, or devices, it will be appreciated that other methods, systems, or devices may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A system for predicting a fall, comprising:

an input device that is wearable on a subject's foot, the input device comprising an insole, the input device comprising a plurality of force sensors for use in obtaining a series of force data from the subject's foot over a time window, and at least a first inertial measurement unit (IMU) for use in obtaining a series of IMU data from the subject's foot over the time window;

a non-transitory storage memory storing a machine learning model trained to employ a set of parameters to generate fall prediction data using input data that comprises at least the series of force data and the series of IMU data;

a processor configured to receive the force data and the IMU data from the input device and input the input data into the machine learning model; and an output device for outputting an indication of the fall prediction data;

wherein the fall prediction data is represented as a vector of risk scores for a plurality of fall contributors, the fall contributors not being mutually exclusive, and wherein the machine learning model is trained using a hierarchy of machine learning algorithms in which training force data and training IMU data are assigned a higher place in the hierarchy than supplemental training data, and wherein, when training a lower machine learning algorithm, parameters of a higher machine learning algorithm are frozen or initialized.

2. The system of claim 1, wherein the machine learning model comprises at least one machine learning algorithm.

3. The system of claim 2, wherein the at least one machine learning algorithm comprises a deep learning neural network.

4. The system of claim 2, wherein the at least one machine learning algorithm comprises a random forest.

5. The system of claim 3, wherein the set of parameters comprise at least one of a weight and a bias.

6. The system of claim 3, wherein the machine learning model is trained to analyze the force data using a 2D or 3D convolutional subnetwork.

7. The system of claim 1, wherein the fall prediction data comprises a risk score, wherein the processor is configured to compare the risk score to a threshold, and wherein the output device is configured to output the indication of the fall prediction data in the form of an alert that is issued if the risk score exceeds the threshold.

8. The system of claim 1 wherein the output device is configured to output the indication of the fall prediction data in the form of an indication that a fall is imminent and/or an indication of a fall contributor for an imminent fall.

9. The system of claim 1, wherein the output device is configured to output the indication of the fall prediction data in the form of a risk score for an imminent fall.

10. The system of claim 1 wherein the input data further comprises supplemental data.

11. The system of claim 10, wherein the supplemental data comprises at least one of kinetic data obtained from the first IMU and the plurality of force sensors, and kinematic data obtained from the first IMU, and wherein the processor is configured to subject the force data, the IMU data, the kinetic data, and/or the kinematic data to statistical analysis and/or feature extraction.

12. The system of claim 10, wherein the supplemental data comprises clinical assessment data, gait related data, physical health data, mental health data, and/or demographic data, and wherein the machine learning model is configured to employ time series analysis, interpolation, and/or pattern recognition on the supplemental data.

13. The system of claim 10, wherein the system further comprises a second input device configured to obtain the supplemental data, wherein the second input device is separate from the input device.

14. The system of claim 1, wherein the input data comprises raw data and/or processed data.

15. The system of claim 1, wherein the machine learning model is configured to rank the input data from most important in generating the fall prediction data to least important in generating the fall prediction data.

16. The system of claim 1, wherein the output device is further configured to provide coaching and/or feedback based on the fall prediction data.

17. The system of claim 1, wherein the machine learning model is configured to generate the fall prediction data for a current time point, and the time window is a fixed size window that precedes and moves with the current time point.

18. The system of claim 1, wherein the system is further configured to store the input data and/or the fall prediction data.

19. The system of claim 1, wherein the input device is configured such that the force sensors and first IMU are positioned underfoot.

20. The system of claim 1, wherein the input device comprises at least a first insole, and wherein the output device comprises a visual output device, an auditory output device, and/or a tactile output device.

* * * * *